(12) United States Patent
D'Addezio et al.

(10) Patent No.: US 12,025,444 B2
(45) Date of Patent: Jul. 2, 2024

(54) METHOD AND SYSTEM FOR MULTI-SCALE ASSIMILATION OF SURFACE WATER OCEAN TOPOGRAPHY (SWOT) OBSERVATIONS

(71) Applicant: The Government of the United States of America, as represented by the Secretary of the Navy, Arlington, VA (US)

(72) Inventors: Joseph D'Addezio, Slidell, LA (US); Innocent Souopgui, Slidell, LA (US); Gregg Jacobs, Slidell, LA (US); Matthew Carrier, Covington, LA (US); Hans Ngodock, Slidell, LA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/881,830

(22) Filed: Aug. 5, 2022

(65) Prior Publication Data
US 2023/0048788 A1    Feb. 16, 2023

Related U.S. Application Data

(60) Provisional application No. 63/230,188, filed on Aug. 6, 2021.

(51) Int. Cl.
*G01C 13/00*    (2006.01)
(52) U.S. Cl.
CPC ......... *G01C 13/008* (2013.01); *G01C 13/002* (2013.01)
(58) Field of Classification Search
CPC .... G01C 13/006; G01C 13/004; G01C 13/00; G01C 13/002; G01C 13/008; G01C 5/06;
(Continued)

(56) References Cited

U.S. PATENT DOCUMENTS

| | | | |
|---|---|---|---|
| 10,120,836 B2 * | 11/2018 | Jacobs | G06F 17/13 |
| 10,268,783 B2 * | 4/2019 | Helber | G06F 30/20 |
| 2020/0160568 A1 * | 5/2020 | Melzer | G06T 11/008 |

FOREIGN PATENT DOCUMENTS

| | | | |
|---|---|---|---|
| CN | 116542029 A | * | 8/2023 |
| CN | 116912459 A | * | 10/2023 |

OTHER PUBLICATIONS

Matthew J. Carrier, John J. Osborne, Hans E. Ngodock, Scott R. Smith, Innocent Souopgui, and Joseph M. D'Addezio. "A Multiscale Approach to High-Resolution Ocean Profile Observations within a 4DVAR Analysis System," Monthly Weather Review, vol. 147, Feb. 2019, pp. 627-643. (17 pages).

(Continued)

*Primary Examiner* — Andre J Allen
(74) *Attorney, Agent, or Firm* — US Naval Research Laboratory; Nigel R. Fontenot

(57) ABSTRACT

A method of forecasting an ocean state via a multi-scale two-step assimilation of Surface Water Ocean Topography (SWOT) observations. The method may include receiving data associated with a prior ocean state forecast associated with SWOT observations, determining a large-scale increment state variable based on a large scale correction associated with the prior ocean state forecast, and determining a small scale initial input value based on (i) a combination of the background state associated with the prior ocean state forecast and (ii) the determined large-scale increment state variable. The method may include generating, based on the determined small scale initial input value, a small scale correction associated with the prior ocean state forecast, determining a small-scale increment state variable based on the small scale correction, and generating a current ocean state forecast based on at least some of this information.

24 Claims, 16 Drawing Sheets

(58) Field of Classification Search
CPC .......... G01C 17/34; G01C 25/00; G01C 5/04;
G01C 9/00; G01C 9/06; G01C 9/14;
G01C 9/18; G01C 21/16; G01C 21/185;
G01C 21/203; G01C 9/12
USPC ......................................... 73/170.29–170.34
See application file for complete search history.

(56) References Cited

OTHER PUBLICATIONS

Innocent Souopgui, J. M. D'Addezio, C. Rowley, S. Smith, G. Jacobs, R. Helber, M. Yaremchuk. "Impact of simulated SWOT Observations in a Multi-Scale Assimilation." Ocean Science Meeting, Feb. 2020, San Diego, CA, USA. (19 pages).

Zhijin Li et al. "A Multiscale Variational Data Assimilation Scheme: Formulation and Illustration." Monthly Weather Review, vol. 143, Sep. 2015, pp. 3804-3822. (19 pages).

Philip A. Muscarella et al. "An examination of a multi-scale three-dimensional variational data assimilation scheme in the Kuroshio Extension using the naval coastal ocean model." Continental Shelf Research, vol. 73, 2014, pp. 41-48. (8 pages).

* cited by examiner

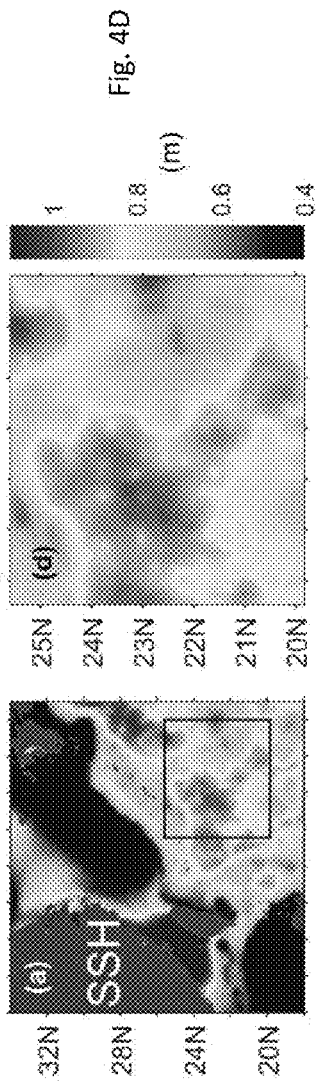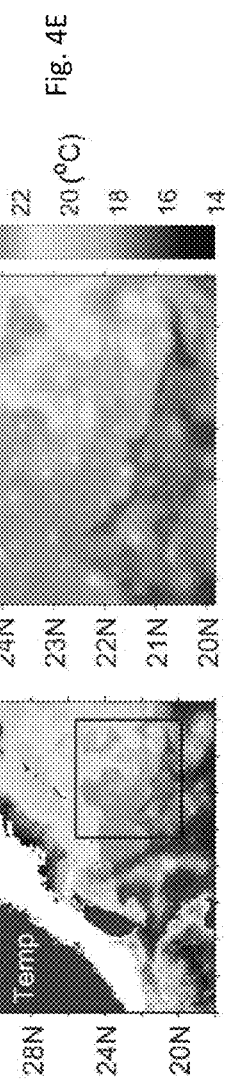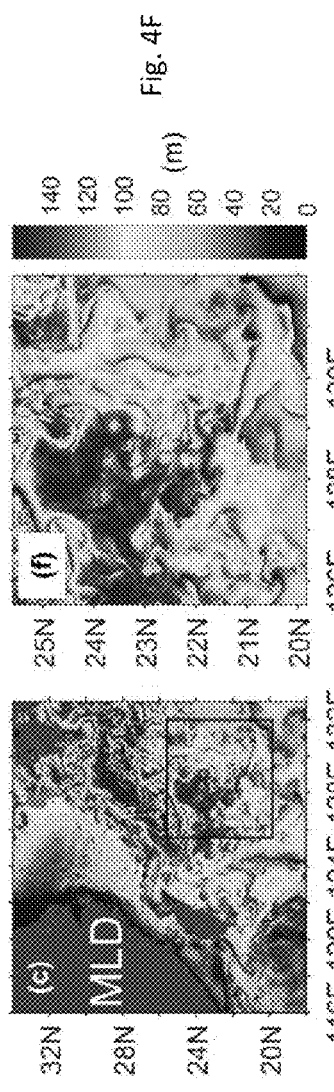
Fig. 4A Fig. 4B Fig. 4C Fig. 4D Fig. 4E Fig. 4F

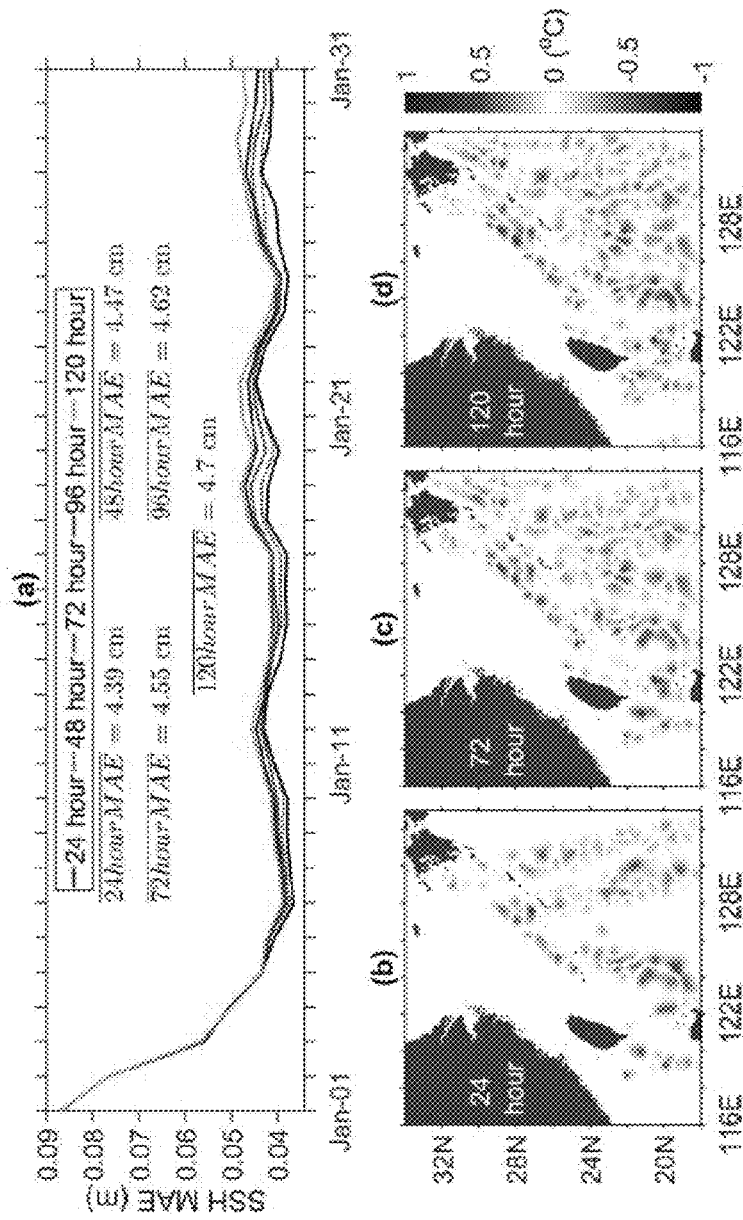

Fig. 5A
Fig. 5B
Fig. 5C
Fig. 5D (a) Sea surface height (SSH; m) mean absolute error (MAE) for 5 different experiments that each used a different assimilation window length in the second, small-scale analysis step: 24 h, 48 h, 72 h, 96 h, and 120 h. Experiment-specific, time-averaged errors are listed in the white space. The lower set of panels show snap shots of 500 m temperature increments from the second, small-scale analysis step for the (b) 24 h, (c) 72 h, and (d) 120 h experiments.

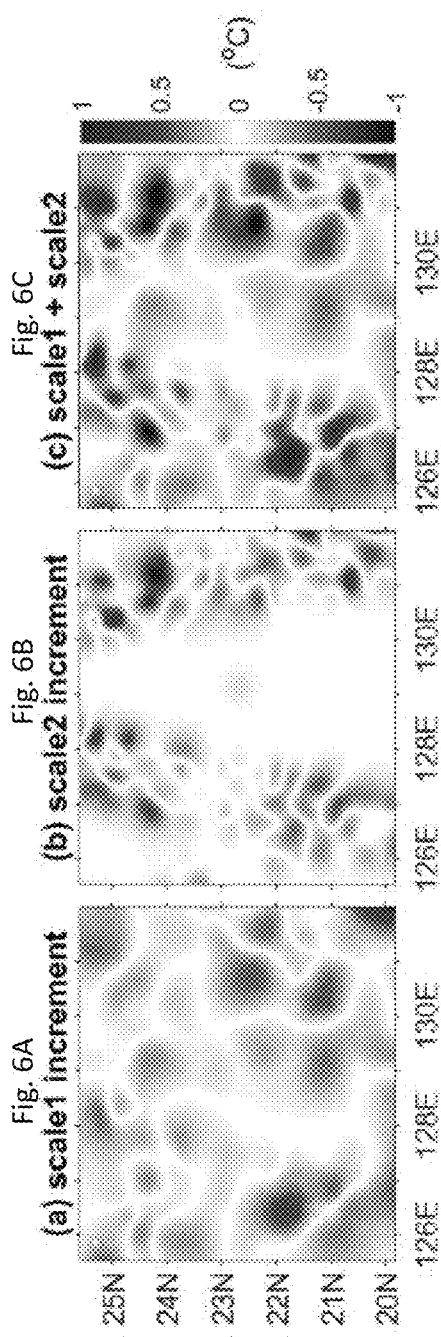
100 m temperature increments for (a) scale 1 (large-scale), (b) scale 2 (small-scale), and (c) the final multi-scale increment (scale 1 + scale 2).

a) Time-space averaged power spectral density (PSD) of 100 m temperature increments (°C²/cpkm) from the SS-AII (single-scale) and MS-AII (multi-scale) experiments.
b) Normalization of each line in (a) by the SS-AII PSD. The large black dot denotes the peak normalized PSD, which occurs at 71 km.

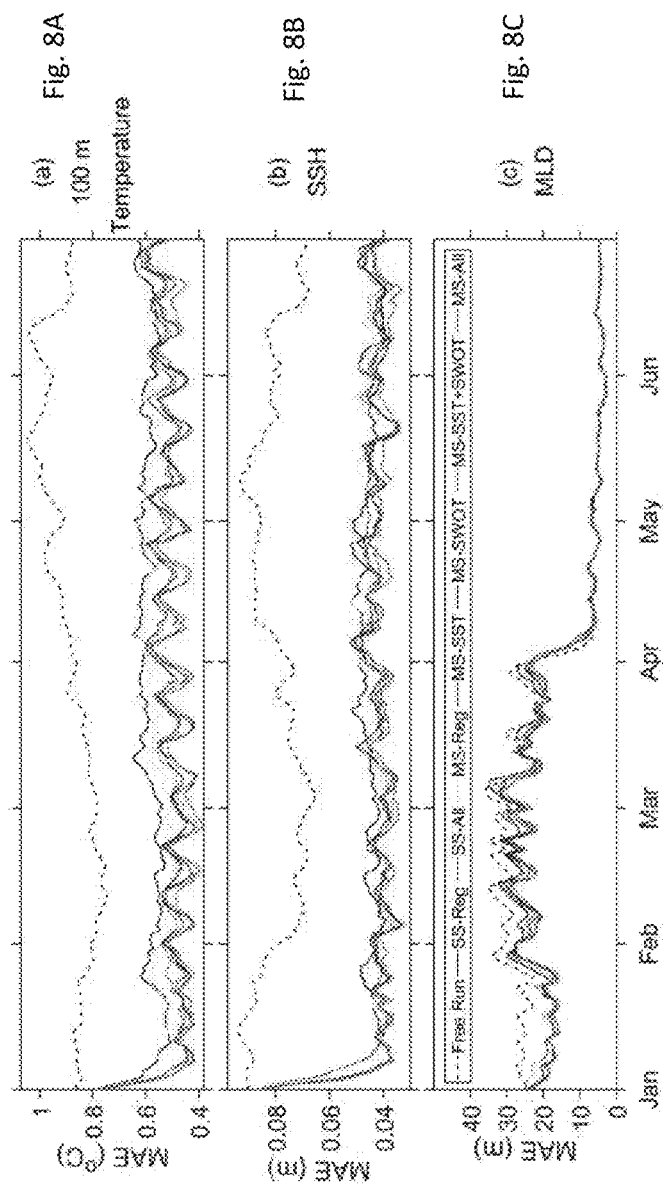
Fig. 8A—Time-series of region-averaged mean absolute error (MAE) relative to the Nature Run for (a) 100 m temperature (°C), (b) sea surface height (SSH; m), and (c) mixed layer depth (MLD; m). See Table 1 for the data types that were assimilated in each of the listed experiments.

a) Time-space averaged temperature mean absolute error (MAE) (°C) with depth relative to the Nature Run averaged over January 1, 2016–June 30, 2016. See Table 1 for the data types that were assimilated in each of the listed experiments. (b) Percent change (%) from the SS-Reg experiment. The Free Run results are off the displayed x-axis range.

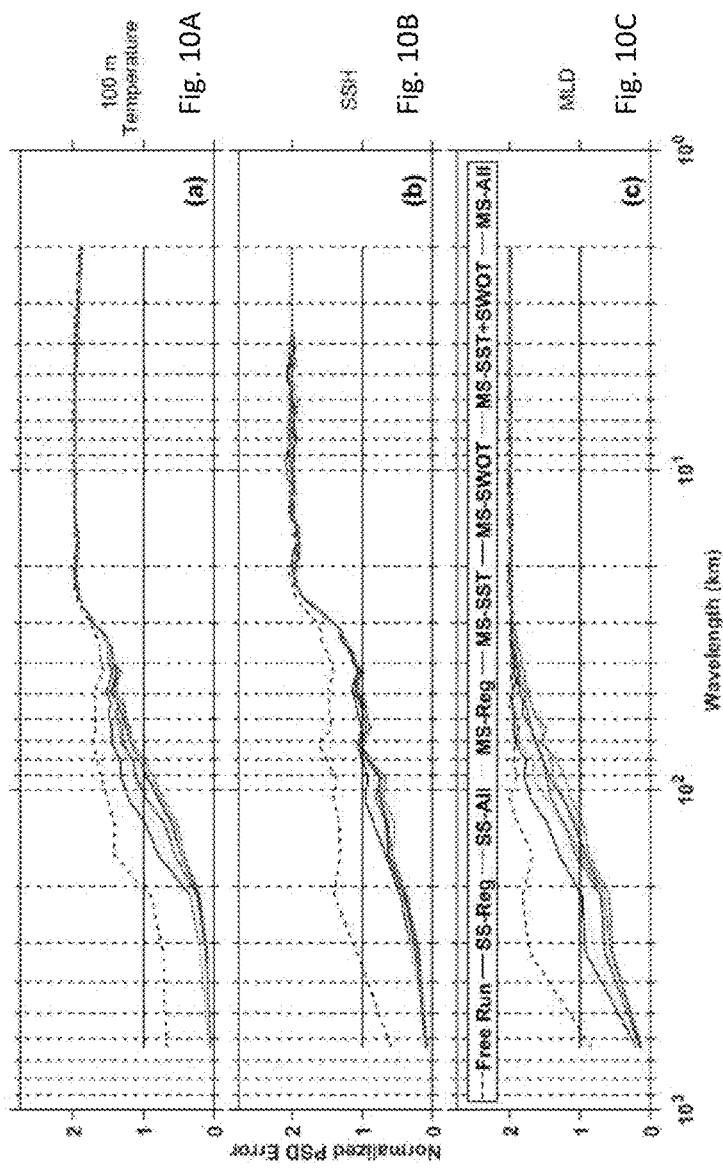

Normalized power spectral density (PSD) of OSSE error determined using Eq. (13) for (a) 100 m temperature, (b) sea surface height (SSH), (c) and mixed layer depth (MLD). See Table 1 for the data types that were deemphasized in each of the listed experiments. The "minimum contaminated wavelength" is defined by where each experiment crosses the reference line, a normalized PSD error value of one.

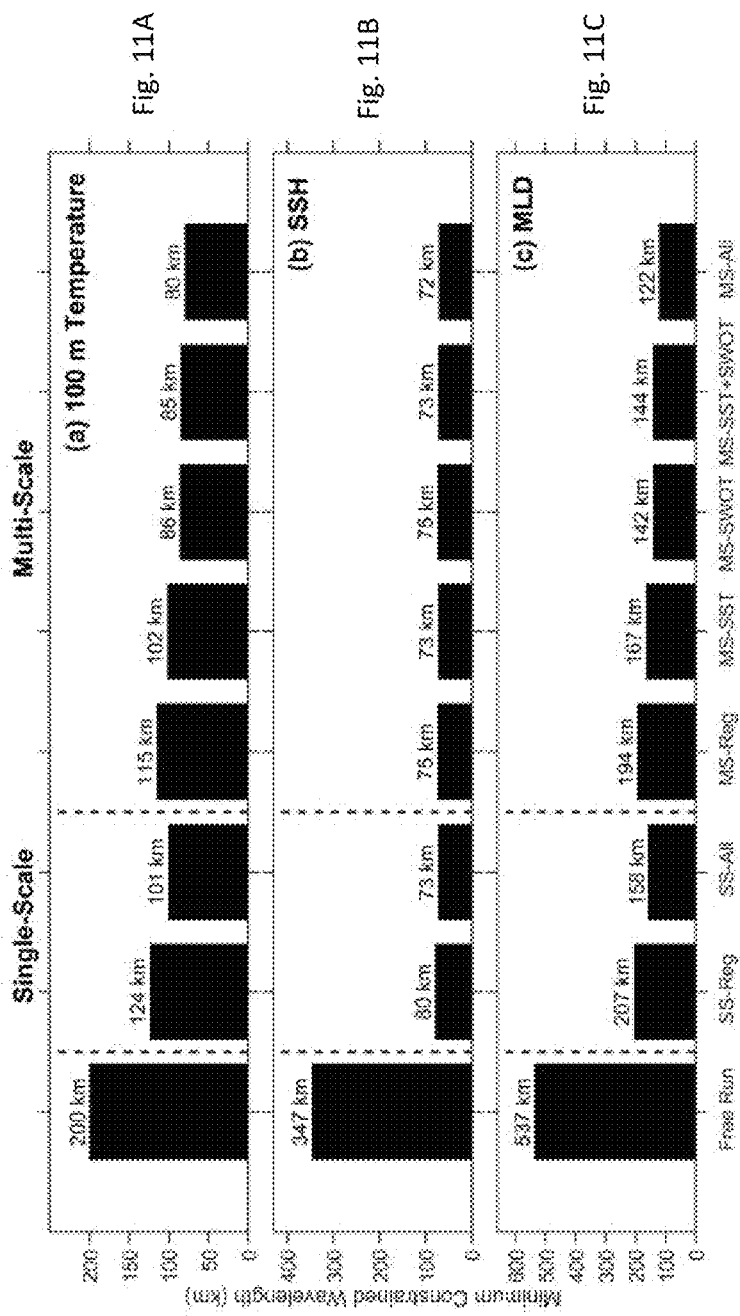
Fig. 11A (a) 100 m Temperature
Fig. 11B (b) SSH
Fig. 11C (c) MLD
Minimum constrained wavelengths (km) for (a) 100 m temperature, (b) sea surface height (SSH), and (c) mixed layer depth (MLD). See Table 1 for the data types that were assimilated in each of the listed experiments.

(a) Time-series of region-averaged mean absolute error (MAE) relative to the Nature Run for mixed layer depth (MLD, m). (b) Time-space averaged temperature MAE (°C) with depth relative to the Nature Run averaged over January 1, 2016–June 30, 2016. See Table 1 for the data types that were assimilated in each of the listed experiments.

METHOD AND SYSTEM FOR MULTI-SCALE ASSIMILATION OF SURFACE WATER OCEAN TOPOGRAPHY (SWOT) OBSERVATIONS

CROSS-REFERENCE

This application is a nonprovisional application of and claims the benefit of priority under 35 U.S.C. § 119 based on U.S. Provisional Patent Application No. 63/230,188 filed on Aug. 6, 2021. The Provisional Application and all references cited herein is hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #210353.

TECHNICAL FIELD

The present disclosure is related to the multi-scale assimilation of Surface Water Ocean Topography (SWOT) observations, and more specifically to, but not limited to, more effectively assimilate novel, high-density SWOT observations for an ocean state forecast.

BACKGROUND

For decades, the scientific and operational oceanographic communities have relied heavily on nadir altimeters to provide mesoscale surface elevation observations, with mesoscale being defined as large-scale eddies with length scales greater than the local Rossby radius of deformation (ranging from 10 km to >100 km depending on latitude) (Chelton et al., 1998). The height observations are then used to generate surface maps resolving sea surface height (SSH) to global average wavelengths of approximately 150 km and greater (Ducet et al., 2000; Fu and Ubelmann, 2014; Ballarotta et al., 2019).

In 2022, the Surface Water Ocean Topography (SWOT) satellite mission (Fu and Ubelmann, 2014) will provide global surface elevation over a high-density 120 km wide swath. This new data source should produce much greater coverage of the mesoscale field, as well as submesoscales on a regional basis (Wang et al., 2019).

Recent studies have quantified the potential impact that SWOT data will have on ocean state estimation and prediction skill (Carrier et al., 2016; Bonaduce et al., 2018; D'Addezio et al., 2019). Using Observing System Simulation Experiment (OSSE) methodologies, these studies found significant improvements in skill when assimilating simulated SWOT data, but also found that each forecast/analysis system could not constrain wavelengths below 100 km, despite the fact that SWOT observations resolve these scales (Gaultier et al., 2016; Wang et al., 2019). Experimenting with the analysis decorrelation length scale, D'Addezio et al. (2019) concluded that multi-scale data assimilation was required to fully utilize the SWOT observations.

Multi-scale assimilation methodologies have recently emerged to deal with observing networks that provide information on a wide range of scales (Muscarella et al., 2014; Li et al., 2015a,b, Miyazawa et al., 2017; Li et al., 2019). For example, glider data can observe the subsurface at very high spatial and temporal resolutions. If the assimilation system is tuned to primarily correct large-scale features (e.g. mesoscale eddies), those high-resolution observations may be underutilized at smaller scales. A glider specific case has been addressed by performing a multi-step 4DVAR analysis, whereby large-scale corrections were made to a background state in the first assimilation step followed by an update to that analysis field using small-scale innovation (background minus observations) residuals (Carrier et al., 2019). This is similar to how multi-scale 3DVAR has been previously implemented (Li et al., 2015a,b, 2019).

The relative sparsity of ocean observations, however, creates a desire to maximize the utility of all available observations.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

Disclosed embodiments effectively assimilate novel, high-density SWOT observations into the United States Navy's regional ocean model: Navy Coastal Ocean Model (NCOM). Data assimilation is a mathematical process by which recent observations are used to update a model (e.g. NCOM). Disclosed embodiments provide a better initial condition to the model and ultimately a more accurate ocean forecast (i.e., estimate of future ocean state) (Souopgui et al., 2020).

The present disclosure provides for a method of forecasting an ocean state via a multi-scale two-step assimilation of Surface Water Ocean Topography (SWOT) observations. The method may include receiving, by a processing device, data associated with a prior ocean state forecast associated with SWOT observations for three-dimensional ocean fields, and generating, by the processing device, a large scale correction associated with the prior ocean state forecast based on a large-scale decorrelation length scale and a long observation time window. The method may include determining, by the processing device, a large-scale increment state variable based on the large scale correction, wherein the large-scale increment is based on a difference between: (i) a background state associated with the prior ocean state forecast; and (ii) an observed ocean state within the long observation time window, and determining, by the processing device, a small scale initial input value based on (i) a combination of the background state associated with the prior ocean state forecast and (ii) the determined large-scale increment state variable. The method may include generating, based on the determined small scale initial input value, a small scale correction associated with the prior ocean state forecast based on the small-scale decorrelation length scale and a small observation time window, wherein the long observation time window is greater than the small observation time window, determining, by the processing device, a small-scale increment state variable based on the small scale correction, and generating, by the processing device, a current ocean state forecast based on (i) the background state associated with the prior ocean state forecast, (ii) the determined large-scale increment state variable, and (iii) the small-scale increment state variable, wherein the current ocean forecast is associated with one or more characteristics of an observed body of water.

The present disclosure provides for a system for forecasting an ocean state via a multi-scale two-step assimilation of Surface Water Ocean Topography (SWOT) observations. The system may include a processing device, and a memory device operably coupled to the processing device, the memory device storing computer-readable instructions that, when executed, cause the processing device to perform a method. The method may include receiving data associated with a prior ocean state forecast associated with SWOT observations for three-dimensional ocean fields, generating a large scale correction associated with the prior ocean state forecast based on a large-scale decorrelation length scale and a long observation time window, and determining a large-scale increment state variable based on the large scale correction, wherein the large-scale increment is based on a difference between: (i) a background state associated with the prior ocean state forecast; and (ii) an observed ocean state within the long observation time window. The method may include determining a small scale initial input value based on (i) a combination of the background state associated with the prior ocean state forecast and (ii) the determined large-scale increment state variable, and generating, based on the determined small scale initial input value, a small scale correction associated with the prior ocean state forecast based on the small-scale decorrelation length scale and a small observation time window, wherein the long observation time window is greater than the small observation time window. The method may include determining a small-scale increment state variable based on the small scale correction, and generating a current ocean state forecast based on (i) the background state associated with the prior ocean state forecast, (ii) the determined large-scale increment state variable, and (iii) the small-scale increment state variable, wherein the current ocean forecast is associated with one or more characteristics of an observed body of water.

The present disclosure provides for a non-transitory computer readable medium comprising computer-readable instructions, the computer-readable instructions, when executed, cause a processing device to perform a method. The method may include receiving data associated with a prior ocean state forecast associated with SWOT observations for three-dimensional ocean fields, generating a large scale correction associated with the prior ocean state forecast based on a large-scale decorrelation length scale and a long observation time window, and determining a large-scale increment state variable based on the large scale correction, wherein the large-scale increment is based on a difference between: (i) a background state associated with the prior ocean state forecast; and (ii) an observed ocean state within the long observation time window. The method may include determining a small scale initial input value based on (i) a combination of the background state associated with the prior ocean state forecast and (ii) the determined large-scale increment state variable, and generating, based on the determined small scale initial input value, a small scale correction associated with the prior ocean state forecast based on the small-scale decorrelation length scale and a small observation time window, wherein the long observation time window is greater than the small observation time window. The method may include determining a small-scale increment state variable based on the small scale correction, and generating a current ocean state forecast based on (i) the background state associated with the prior ocean state forecast, (ii) the determined large-scale increment state variable, and (iii) the small-scale increment state variable, wherein the current ocean forecast is associated with one or more characteristics of an observed body of water.

BRIEF DESCRIPTION OF THE DRAWINGS

FIGS. 4A-4F illustrate images of a multi-scale 3DVAR system in a high-resolution (1 km) simulation of the western Pacific Ocean, in accordance with disclosed aspects.

FIG. 5A illustrates sea surface height (SSH; m) mean absolute error (MAE) for 5 different experiments that each used a different assimilation window length in the second, small-scale analysis step: 24 h, 48 h, 72 h, 96 h, and 120 h, in accordance with disclosed aspects.

FIGS. 5B-5D illustrate snap shots of 500 m temperature increments from the second, small-scale analysis step for the (b) 24 h, (c) 72 h, and (d) 120 h experiments, in accordance with disclosed aspects.

FIGS. 6A-6C illustrate 100 m temperature increments for (a) scale 1 (large-scale), (b) scale 2 (small-scale), and (c) the final multi-scale increment (scale 1+scale 2), in accordance with disclosed aspects.

FIGS. 8A-8C illustrate time-series of region-averaged mean absolute error (MAE) relative to the Nature Run for (a) 100 m temperature (° C.), (b) sea surface height (SSH; m), and (c) mixed layer depth (MLD; m), in accordance with disclosed aspects.

FIGS. 10A-10C illustrate normalized power spectral density (PSD) of OSSE error determined using Eq. (13) for (a) 100 m temperature, (b) sea surface height (SSH), (c) and mixed layer depth (MLD). The minimum constrained wavelength may be where each experiment crosses the reference line: a normalized PSD error value of one, in accordance with disclosed aspects.

FIGS. 11A-11C illustrate minimum constrained wavelengths (km) for (a) 100 m temperature, (b) sea surface height (SSH), and (c) mixed layer depth (MLD), in accordance with disclosed aspects.

DETAILED DESCRIPTION

Figure 1:
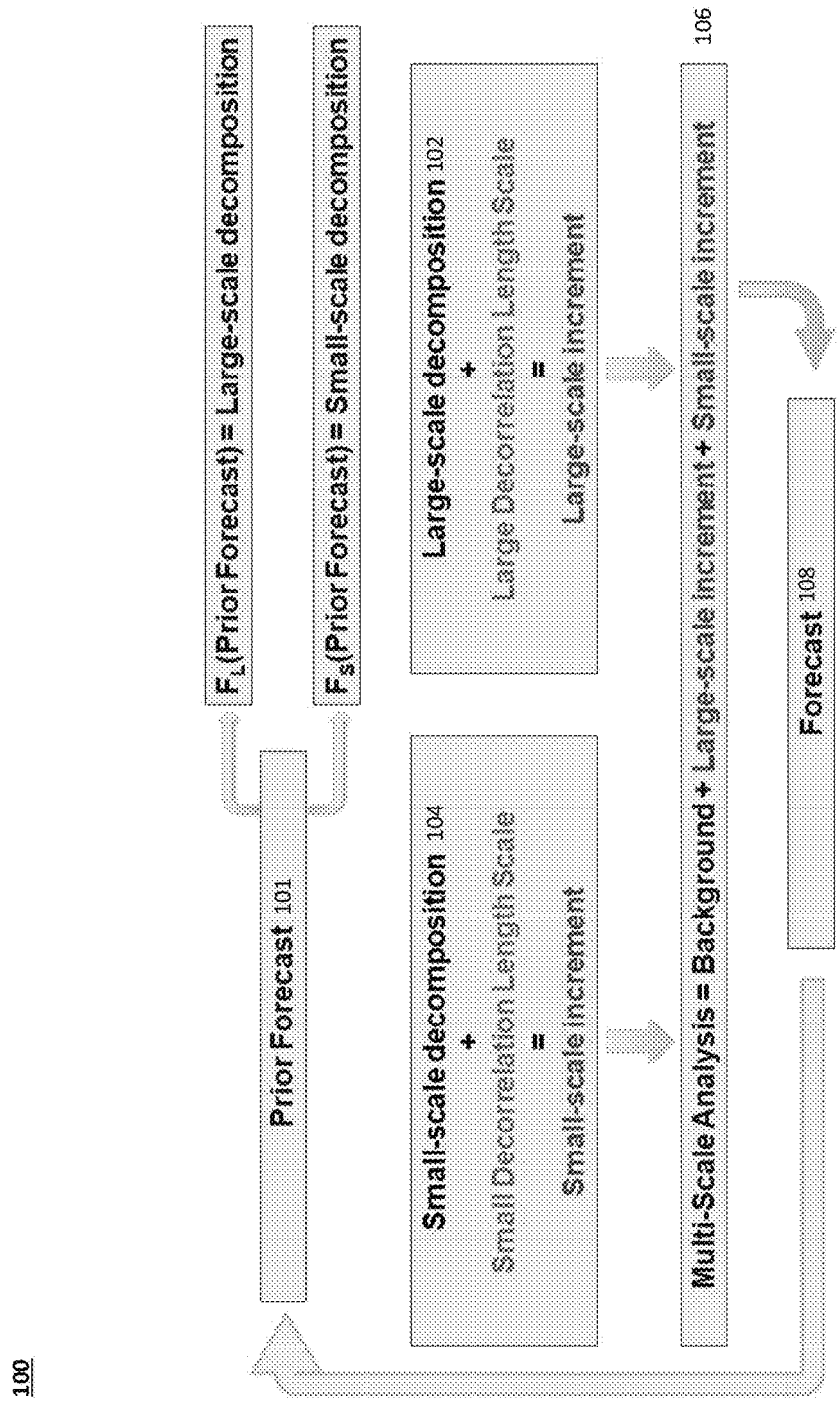
FIG. 1 illustrates a conventional multi-scale ocean data assimilation.

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

Section 1. Introduction

In FY23, NASA will launch the Surface Water Ocean Topography (SWOT) satellite into near-Earth orbit. The onboard KaRIn sensor is set to, for the first time, map surface ocean topography (i.e. sea surface height) in two dimensions. The current state of the art sensor, nadir altimeters, only measure the sea surface height in one dimension (i.e. along the ground track). In addition to mapping in 2D, the SWOT sensor will generate maps in much higher resolution; from ~7 km (nadir altimetry) to ~1 km (SWOT). These sensor innovations provided the impetus for an update to U.S. Navy assimilation systems that resulted in the disclosed embodiments.

Disclosed embodiments follow that tradition by implementing a two-step 3DVAR analysis in which the first step makes a large-scale correction to the model background and the second step makes a small-scale correction to the first step. The multi-scale assimilation is tested using an OSSE methodology, whereby simulated observations are sampled from a free running model simulation (the Nature Run). A second model assimilates the simulated observations, and we compare the second model to the Nature Run to evaluate errors (e.g. Halliwell et al., 2014).

One or more aspects provide for testing a multi-scale 3DVAR system in a high-resolution (1 km) simulation of the western Pacific Ocean (FIGS. 4A-4F). We find that the sequential multi-scale analysis consistently outperforms the single-scale analysis. More precisely, when compared with the single-scale assimilation, the multi-scale assimilation reduces the constrained scales by 21 km and 36 km for 100 m temperature and mixed layer depth (MLD), respectively.

For example, using a simulator provided by the Jet Propulsion Laboratory (JPL), NRL was able to test how simulated SWOT observations would affect assimilation/forecast skill using current Navy assimilation systems (D'Addezio et al., 2019). The current assimilation approach makes a single, relatively large-scale update the model based on the relatively coarse data provided primarily by the nadir altimeters. The scientific work found that although the SWOT data improve assimilation/forecast skill using the current single-scale system, the novel data are underutilized and a new formulation was required. This is precisely because the prior system (e.g., FIG. 2) only makes a single, large-scale update to the model, even though the SWOT observations provide valuable information at smaller scales.

The system update was inspired by recent innovations in multi-scale ocean data assimilation (e.g. Li et al., 2015a), such as shown in FIG. 1. The assimilation theory presented a two-step assimilation process 100 by which large-scale observations make a large-scale (102) update to the model (101) and small-scale observations make a subsequent relatively small-scale update (104) to the model (101). The large-scale and small scale analyses are combined with the prior forecast model (101) to create a multi-scale analysis (106) for generating the next forecast model (108).

In accordance with disclosed aspects, we refined and improved the multi-scale process, making innovations while also making the method compatible with the current U.S. Navy operational assimilations systems.

Disclosed embodiments provide for one or more methods and/or systems for multi-scale assimilation of Surface Water Ocean Topography (SWOT) observations. Disclosed embodiments provide for assimilating Surface Water Ocean Topography (SWOT) observations on multiple spatial scales in order to better utilize the novel data and increase model skill. Disclosed embodiments provide for assimilating more of the high-density observations on smaller scales without losing model skill at larger scales.

Disclosed aspects use an Observing System Simulation Experiment (OSSE) to quantify improvements in ocean state estimation due to the assimilation of simulated Surface Water Ocean Topography (SWOT) observations using a multi-scale 3DVAR approach. The sequential multi-scale assimilation first generates a large-scale analysis and then updates that analysis with smaller scale corrections. In some embodiments, temperature and salinity depth profiles can be used as proxies for sea surface height (SSH) observations. Skill metrics consistently show that the multi-scale analysis is superior to the single-scale analysis, specifically because it improves small-scale skill without sacrificing skill at larger scales.

The analysis skill over a range of spatial scales is determined using wavenumber spectral analysis of 100 m temperature, SSH, and mixed layer depth (MLD). For MLD, the multiscale assimilation of SWOT data reduces the minimum constrained wavelength from 158 km to 122 km, a 36 km reduction, compared to a single-scale assimilation of the same data. For SSH, the multi-scale approach reduces constrained scales from 73 km to 72 km, a 1 km reduction. This small increase in skill is caused by the steep wavenumber spectral slope associated with SSH, which suggests that SSH variability is concentrated at long wavelengths. Ultimately, the small-scale update in the multi-scale assimilation has less to correct for SSH. In contrast, MLD has a relatively flat spectral slope. The multi-scale solution can make a more substantial update to the MLD field because it has more small-scale variability. Thus, our results suggest that the magnitude of the skill improvement provided by the multi-scale solution is negatively correlated with the spectral slope of the ocean variable.

Prior methods and systems require a scale separation of the nonlinear model and observations (FIG. 1). Disclosed embodiments, however, may use assimilation parameters to control how model/observation differences are calculated. One or more aspects may implement a scale-dependent observation window. One or more aspects may account for the transient nature of small-scale phenomena by assimilating more recently taken observations in the second, small-scale assimilation step. One or more aspects provide for the assimilation of SWOT observations, such as obtained from a SWOT simulator.

Figure 2:
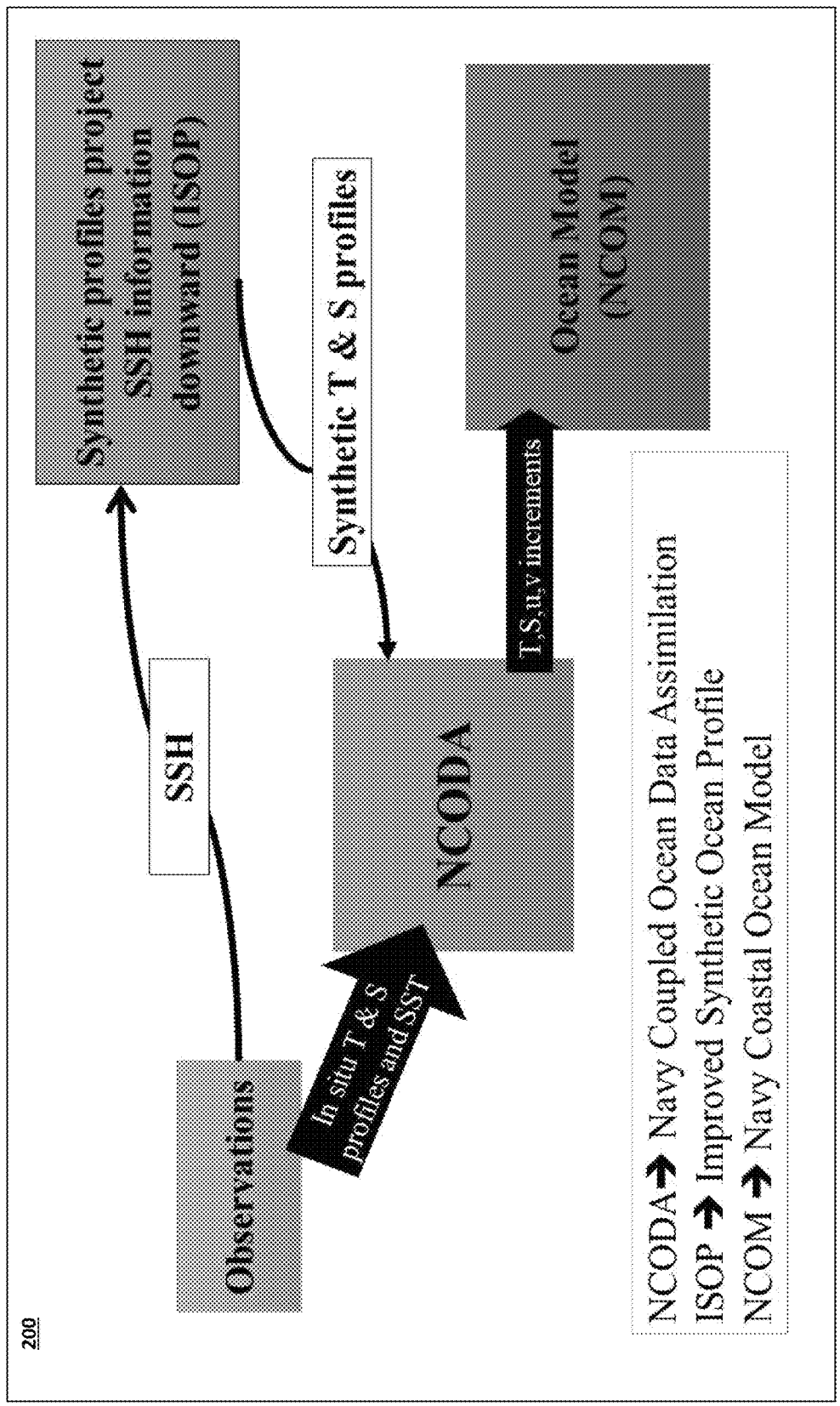
FIG. 2 illustrates a schematic flow diagram of the current operational Navy Coupled Ocean Data Assimilation (NCODA) system.

FIG. 2 illustrates a schematic flow diagram 200 of the current operational Navy Coupled Ocean Data Assimilation (NCODA) system. NCODA takes in recent ocean observations of: sea surface temperature (SST), in situ profiles of temperature & salinity, and sea surface height (SSH). SSH is further processed into inferred synthetic temperature and salinity profiles using the Improved Synthetic Ocean Profile (ISOP) (e.g., U.S. Pat. No. 10,268,783 B2) system. The SST, profiles, and synthetic profiles are then input into NCODA which creates and an "increment." The increment is then added to the "background," which is typically the latest prior forecast generated by the model (i.e., NCOM). Disclosed embodiments provide a novel reformulation of Navy operational data assimilation to account for the multi-scale, high-density observations SWOT will provide.

Figure 3:
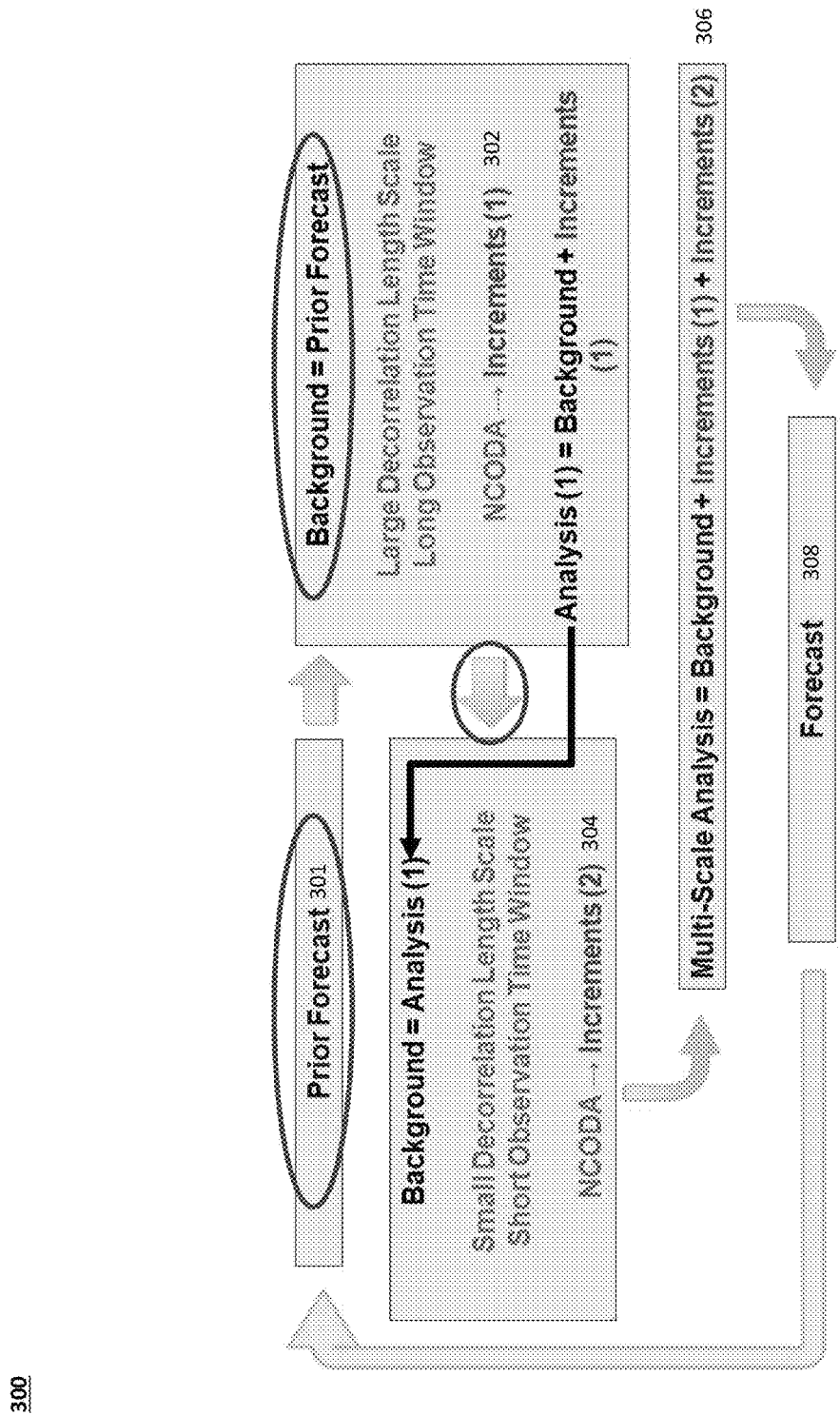
FIG. 3 illustrates an exemplary schematic flow for multi-scale assimilation of Surface Water Ocean Topography (SWOT) observations, in accordance with disclosed aspects.

FIG. 3 is a schematic flow diagram 300 for Multi-scale Assimilation of Surface Water Ocean Topography (SWOT) Observations in accordance with one or more disclosed embodiments. FIG. 3 illustrates an exemplary process for one or more disclosed embodiments to leverage NCODA to produce a multi-scale analysis of SWOT observations. Disclosed embodiments make, for example, two corrections to the nonlinear model: 1) a large-scale correction (302) based on relatively large assimilation scales and a long observation window (i.e. observation age), and 2) a small-scale correction (304) based on relatively short assimilation scales and a short observation window. The large-scale (302) and small scale correction (304) may be combined with the background/prior forecast model (301) to create a multi-scale analysis (306) for generating the next forecast model (308).

Disclosed embodiments leveage two parameters in NCODA: (1) the decorrelation length scale of the assimilation and (2) the observation time window. The decorrelation length scale of the assimilation dictates the horizontal scale the resulting increments will have. Larger numbers create increments with larger length scales; smaller numbers create increments with smaller length scales. The observation time window controls the age of the observations that make it into NCODA. A longer window brings in observations taken farther in the past (e.g. all observations taken within the last 5 days); a shorter window brings in observations taken more recently (e.g. all observations taken within the last day).

The process 300 begins by gathering the latest model forecast 301. This 3D field is taken as the "background" (i.e. first guess) for the first analysis. NCODA is set to have a large-scale decorrelation length scale and a relatively long observation window (302). This analysis targets the correction of large-scale features with long time scales. An additional unique innovation lies in this step. The theory (Li et al., 2015a) suggests a separation of physical scales in the background before assimilating observations. This is typically accomplished by running a low-pass filter over the state variables in the background model before the first step. Instead, the one or more disclosed aspects use the assumptions implicit within NCODA and the large-scale parameters used in the first assimilation step to perform this "filtering." NCODA uses a second order auto-regressive (SOAR) function that determines the horizontal scales found the resulting increments. By using a large-scale decorrelation length scale in the first assimilation step, one or more disclosed aspects ensure only large-scale scale corrections are generated in the first large-scale assimilation step; no manual filtering of the background is required. By using the first analysis as the background of the second, the second assimilation is only targeting residual, small-scale error not corrected for in the first large-scale assimilation. Thus, the multi-scale assimilation completes by performing a second assimilation (304) with the first as the background and by using a small-scale decorrelation scale and a relatively short observation window. This illustrates at least one of the unique innovations of disclosed embodiments. Smaller scale features are more transient. If a long observation window is used in the second, small-scale assimilation, small-scale features will be assimilated at locations where they no longer exist at the time of assimilation. Therefore, one or more disclosed aspects correlates the space/time scales in each of the two assimilation steps.

Section 2 details the configuration of our multi-scale assimilation system. The primary multi-scale 3DVAR parameter is the decorrelation length scale of the background error covariance, but we also explore a temporal component: the length of the small-scale assimilation window. The assimilation window is the length of time that observations are allowed into the data assimilation analysis. The large-scale analysis uses a 5-day assimilation window to correct the slowly evolving mesoscale field. We show that because the smaller scale phenomena are transient, the small-scale update to the model background requires a shorter assimilation window.

Section 3 documents errors generated by each of our OSSE experiments. We focus our error analysis on variables that feature variability over a wide range of scales: 100 m temperature, SSH, and MLD. We provide errors in time, with depth, and in the wavenumber spectral domain. The focus of the study is to test the analysis skill improvement when using simulated SWOT observations in a multi-scale assimilation system as opposed to a single-scale system. Another important goal is to test the optimal set of observations used in the second analysis step. Nadir altimeter observations are coarse in the across-track direction; however, our results suggest that it is still appropriate to include these data in the small-scale correction.

Section 2. Methods

In this section, we detail the construction of an OSSE framework to test how well a multi-scale analysis system can improve the assimilation of simulated SWOT observations. Several components are necessary: a numerical model, simulated observations, and an assimilation system. This section describes each component and how it was used in conjunction with one another to produce the results presented in Section 3.

2.1. Numerical Model

The Navy Coastal Ocean Model (NCOM) (Barron et al., 2006) produced our simulated three-dimensional ocean fields. NCOM integrates the primitive equations forward in time using a leapfrog approach. The dynamics utilize hydrostatic and Boussinesq approximations. The vertical coordinate is a hybrid o/z grid. The experimentation presented here used 50 vertical levels. At rest, the surface sigma layer is approximately 1 m thick, and layer thicknesses steadily increase to a maximum depth of 4000 m. In the horizontal, the grid spacing was set to 1 km; this resolution being an important threshold for simulating the full mesoscale field as well as submesoscale eddies with length scales O(10 km) (Capet et al., 2008). A double nesting procedure provided lateral boundary conditions to the final 1 km grid. Firstly, the global 1/12° Hybrid Coordinate Ocean Model (HYCOM) (Metzger et al., 2017) provided boundary conditions to a 3 km NCOM simulation with boundaries at least 3-away from the final 1 km NCOM grid on all sides. The 3 km NCOM simulation then provided boundary conditions to the final 1 km NCOM simulation. Surface forcing was provided by the Navy Global Environment Model (NAVGEM) (Hogan et al., 2014) and included: surface wind stress, latent heat flux, sensible heat flux, solar radiation, and precipitation. The NAVGEM data have 3 hourly output and approximately 37 km grid spacing. A monthly climatology river database (Barron and Smedstad, 2002) provided fresh water flows to the ocean boundaries. Finally, tidal forcing from the global Oregon Tidal Inverse Solution (OTIS) (Egbert and Erofeeva, 2002) was included along the open boundaries for just the 1 km nested simulation.

Using these model parameters, we simulated the western Pacific Ocean (116° E-133° E; 18° N-34° N; FIGS. 4A-4F), a region of substantial mesoscale, submesoscale, and internal wave variability. This is due, in part, to the strong Kuroshio boundary current that runs through the region. Additionally, the domain features strong barotropic tides that interact with the shelf break to produce strong internal tides that propagate into the open ocean and interact with variable vertical stratification set primarily by the mesoscale field. These interacting dynamics make ocean state estimation and prediction challenging, and therefore represents an interesting region to study the utility of the multi-scale assimilation system.

The 1 km NCOM simulation without data assimilation generated the Nature Run. The 3 km NCOM simulation on Dec. 1, 2015 interpolated spatially provided the initial condition for the Nature Run. We then integrated the Nature Run forward to Dec. 31, 2016. The 3 km initial condition lacked many of the smaller scale dynamics we are targeting in our multi-scale assimilation, so the one-month spin up in December 2015 was conducted to allow for these small-scale features to properly develop. This was confirmed visually by comparing the surface eddy kinetic energy (EKE) of the 3 km initial condition to the EKE field generated by the end of the spin up on Dec. 31, 2015. It was also confirmed quantitatively by a clear linear trend in increasing EKE of 0.0014 m2 s−2 per day over the month of December 2015, with the EKE plateauing near the very beginning of January (results are not shown here). A more detailed validation of the Nature Run can be found in D'Addezio et al. (2019). Not accounting for the spin up month, the final time window for the Nature Run was Jan. 1, 2016-Dec. 31, 2016. FIGS. 4A-4F shows a diverse interaction of large- and small-scales, making the Nature Run simulation useful for the multi-scale state estimation problem we are trying to solve. Each OSSE was perturbed by using a different initial condition from the Nature Run. More specifically, the Dec. 1, 2016 Nature Run state was used as the initial condition for each of the OSSE experiments on Dec. 1, 2015. The boundary conditions, surface forcing, and model parameters used for the Nature Run were also those used for the OSSE experiments. Each OSSE simulation was integrated forward without data assimilation for the month of December 2015. This extra one-month spin up allowed each experiment to develop significant differences from the Nature Run trajectory such that simulated observations correct the respective OSSE state towards the truth. Starting Jan. 1, 2016, each OSSE was integrated forward in time after assimilation by either the single- or multi-scale analysis, using simulated observations sampled from the Nature Run. An analysis field (single-scale or multi-scale) was generated every 24 h at 00Z throughout the experiments. The way in which those simulated observations were generated and assimilated is documented in the remainder of Section 2.

2.2. Simulated Observations

Sampling of the Nature Run over Jan. 1, 2016-Dec. 31, 2016 provided simulated observations of sea surface temperature (SST), in situ depth profiles, nadir altimeters, and SWOT. Real-world observation times and locations provided realistic sampling of the Nature Run for SST, in situ profile, and nadir altimeter observations. The nadir altimeters included Jason-2, AltiKa, and CryoSat-2. To generate simulated SWOT data, we used version 2.0.0 of the Jet Propulsion Laboratory's (JPL) SWOT simulator (Gaultier et al., 2016) to provide times and locations at which we sampled the Nature Run. The SWOT simulator sampled instantaneous (not time-averaged) 3 hourly output of the Nature Run. The SWOT simulator along- and across-track resolutions were 2 km, the default for the simulator. The operational Navy Coupled Ocean Data Assimilation (NCODA) system uses Improved Synthetic Ocean Profile (ISOP) to convert SSH observations into climatology-based subsurface temperature and salinity (Helber et al., 2013). The conversion uses historical profile observations to build the covariances between SSH anomalies and subsurface temperature and salinity. Naturally, errors are induced in the process of constructing the synthetic profiles. An example of ISOP temperature and salinity error distributions for the region and time frame used in this application are demonstrated in D'Addezio et al. (2019)(see their FIG. 10). Our interest is in the spatial resolution effects, and not necessarily the effects of the synthetic profile errors. Therefore, we extracted temperature and salinity profiles from the Nature Run at the nadir altimeter and SWOT geographic locations and times. By sampling the Nature Run subsurface temperature and salinity at the nadir altimeter and SWOT locations and times, we mimic how SSH observations are assimilated operationally using ISOP and bypass errors associated with the synthetic generation process. Tidal harmonics were not filtered from the sampled temperature and salinity observations. The presence of tides in these data will primarily manifest in the form of baroclinic tides produced when barotropic tides interact with bathymetry in the presence of vertical stratification. Eddies and waves can become superimposed phenomena at smaller scales (Chavanne et al., 2010). Therefore, this will be an additional source of error in our OSSE configuration as the assimilation system used here (single-scale or multi-scale) targets eddy features primarily in geostrophic balance, and not internal waves.

This replacement of SSH anomalies with temperature and salinity profiles does limit the OSSE realism, and according to some aspects, may allow, in some examples, for determining the impact of the data density. One focus is on comparing and contrasting skill when using different assimilation systems (single-scale vs. multiscale) and different observations types (nadir altimeters vs. SWOT).

2.3. Data Assimilation 2.3.1. Single-Scale Data Assimilation

The single-scale data assimilation system used in this study is the 3DVAR built into NCODA (Cummings, 2005). NCODA-3DVAR minimizes the following incremental cost function:

$$J(\delta x) = \frac{1}{2}\delta x^T B^{-1} \delta x + \frac{1}{2}(H\delta x - d)^T R^{-1}(H\delta x - d) \qquad (1)$$

In the cost function (Eq. (1)), δx is the incremental state variable (hereafter referred to as the increment) defined as: $\delta x = x - x^b$, where x is the state vector and $x^b$ is the background state vector, which in this case is a prior forecast from the numerical model described in Section 2.1. B is the matrix of error covariance associated with the background state vector. d is the innovation defined as $d = y^o - Hx^b$, where $y^o$ is the observation vector, H is the observation operator that maps the model state vector to the observation, and R is the observation error covariance. NCODA-3DVAR carries the minimization out in the observation space (also known as dual space) by solving the following linear system:

$$\delta x^a = BH^T(HBH^T + R)^{-1} d \quad (2)$$

NCODA-3DVAR also separates the background error covariance for each model variable into the background error variance and the background error correlation as:

$$B = \Sigma C \Sigma^T \quad (3)$$

where $\Sigma^2$ is the variance and C is the correlation matrix. C is further decomposed into vertical, horizontal, and flow dependent components:

$$C(x,y,z,x',y',z') = C^h(x,y,x',y') C^v(z,z') Cf)(x,y,x',y') \quad (4)$$

where (x, y, z) and (x', y', z') are the locations of the two points between which the correlation is required, $C^h$ is the horizontal correlation, $C^v$ is the vertical correlation, and C is the flow dependent correlation. We focus on $C^h$, as it is the key to the definition of the correlation for different horizontal scales. We refer the reader to Cummings (2005) for more details on the other terms of the correlation, as well as the crosscorrelation in NCODA-3DVAR. NCODA-3DVAR models $C^h$ as a second order auto-regressive (SOAR) function:

$$C^h(x, y, x', y') = \left(1 + \frac{s}{L_c}\right) e^{\left(-\frac{s}{L_c}\right)} \quad (5)$$

where $s = \|(x-x', y-y')\|$ is the distance between the points (x, y) and (x', y') and Lc is the prescribed decorrelation length scale. NCODA-3DVAR defines the decorrelation length scale as the first local baroclinic Rossby radius of deformation, scaled by a proportionality constant. For the single-scale assimilation experiments in this application, that proportionality constant was set to 1.2, specifically because this default value is known to produce good results in NCODA-3DVAR. NCODA-3DVAR computes the background error variance from a time history of analyzed model increments with a relaxation to the climatology-defined variance (Cummings, 2005; Jacobs et al., 2014a).

With the horizontal decorrelation length scale set close to the Rossby radius of deformation, the data assimilation process corrects for features of the order of the mesoscale. This is consistent with the effective resolution of nadir altimetry (in the across-track direction) and in situ profile data currently available (Ballarotta et al., 2019; see their FIG. 8). Future observations, such as those from the SWOT mission, will allow for corrections to the background state at higher resolution than mesoscale. With the assumption of uncorrelated observation errors and in the presence of high density of observations, the quality of analysis may decrease as shown by Liu and Rabier (2002). For that reason, it is often necessary to reduce the density of observations to assimilate. The size of the system to solve is a function of the number of observations to assimilate and the computational cost is a function of the size of the system. Also, redundant (in the sense of the decorrelation length scale) observations affect the conditioning of the system and adds to the computational cost, resulting in slow convergence in the presence of round-off error. In NCODA, the reduction of the number of observations to assimilate, commonly known as observation thinning, uses the local decorrelation length scale to control the density of the observations to assimilate. The larger the decorrelation length scale, the smaller the spatial density of kept observations going into the minimization. Likewise, the smaller the decorrelation length scale, the larger the spatial density of kept observations going into the minimization.

Consequently, the proportionality constant used in conjunction with the Rossby radius of deformation to define the decorrelation length scale indirectly defines the density of observations to assimilate. Thus, it was used in the multi-scale experiments presented in this application to define the density of observations going into the analysis for each scale. NCODA uses two thinning methods: "super-obing" and "selection." Thinning by super-obing, combines many observations in a given area (by weighted averaging or other methods) to make one single observation called the super-observation. In this experiment, the super-obing technique is applied to SST observations, whereby all SST observations over a decorrelation length scale are averaged into a single value. Thinning by selection selects one observation among other observations in a given area. In this experiment, thinning by selection within a decorrelation length scale was used for profile observations. Because we have substituted nadir altimeter and SWOT SSH observations for temperature and salinity profiles (see Section 2.2), thinning by selection also applied to these data types. Thinning as described in this paragraph is the approach used by NCODA; some state of the art thinning methods can be found in Gratton et al. (2015), Liu and Rabier (2002), Li et al. (2010), and Ochotta et al. (2005).

An assimilation window may be the past-looking period over which we collected observations to be assimilated. The NCODA default assimilation windows are 120 h (5 days) for SSH, 288 h (12 days) for profiles, and 24 h (1 day) for SST. These values were derived empirically through rigorous testing (e.g. Jacobs et al., 2014a,b). As described in Section 2.2, we used profiles as proxies for SSH observations, and the assimilation window for this group of profiles was set to the 5 days like observations from present nadir altimeter satellites. The innovation for SST used the First Guess at Appropriate Time (FGAT), meaning that the background is valid at the observation time. FGAT is useful for fitting phenomena with an essential time component, such as diurnal warming. FGAT was not applied to any other observations types.

2.3.2. Multi-Scale Data Assimilation

For the multi-scale assimilation, we follow the methodology of Li et al. (2015a) and decompose the increment into:

$$\delta x = \delta x_L + \delta x_S \quad (6)$$

where $\delta x_L$ and $\delta x_S$ denote the uncorrelated large- and small-scale components of δx, respectively. With the mitigation of scale aliasing as suggested by Li et al. (2015a), we compute the multi-scale increments as:

$$\delta x_L^a = B_L H^T (HB_L H^T + R_L)^{-1} d_L \quad (7)$$

$$\delta x_S^a = B_S H^T (HB_S H^T + R_S)^{-1} d_S \quad (8)$$

where subscript L stands for large-scale and the subscript S stands for small-scale. In the decomposition of δx into large- and small-scale, we assume there exist two linear operators $P_L$ and $P_S$ that can decompose the state vector into distinct uncorrelated spatial scales. Spatial filters and orthogonal decompositions are examples of such decomposition functions. With the operators $P_L$ and $P_S$, the background xb and observation vector yo are also decomposed into their respective large and small-scale components and are used to compute the large- and small-scale innovation $$d_L = y_L^o - x_L^b \text{ and } d_S = y_S^o - x_S^b.$$

The choice of the decomposition operators $P_L$ and $P_S$ remains a challenge. The best choice will certainly be application-dependent. For the purposes of this application, we leverage the filtering properties of the analysis equation (Eq. (2)) that has been used in operational data assimilation for decades. A large decorrelation scale in the background error covariance imposes strong filtering on small scales in the analysis and therefore acts as a low pass filter (Daley, 1991; Li et al., 2015a). Thus, Eq. (2) using a large decorrelation scale results in a large-scale increment. The large-scale filter $P_L$ is implicitly built into the analysis equation for the large-scale; therefore, we do not know how to apply that operator to the background fields. However, we can estimate the small-scale innovation, given the large-scale increment as follows:

$$d_S = y^o - H(x^b + \delta x_L^a) \quad (9)$$

In fact, by replacing the full observation vector and the full background by their decomposition into large and small scales, the right hand side of Eq. (9) becomes $y_L^o - H(x_L^b + \delta x_L^a) + y_S^o - H x_S^b$. The term $y_L^o - H(x_L^b + \delta x_L^a)$ is negligible thanks to the correction from the large-scale analysis. As a result, $y^o - H(x^b + \delta_L^a)$ is an appropriate approximation of the small-scale innovation. With this observation vector, we carry out two analyses in two sequential steps as follows:

$$\delta x_L^a = B_L H^T (H B_L H^T + R_L)^{-1} d \quad (10)$$

$$\delta x_S^a = B_S H^T (H B_S H^T + R_S)^{-1} d_S \quad (10)$$

Notice that the first step (large-scale analysis) uses the full innovation. We rely on the filtering properties of the analysis equation to produce the large-scale increment. The second step (small-scale analysis) uses the small-scale innovation from Eq. (9). This approach, where the small-scale innovation is computed from the background updated with the large-scale increment, is similar to the one used by Carrier et al. (2019) with 4DVAR data assimilation. For the large-scale analysis, we computed the background error variance from a time history of analyzed model increments with a relaxation to the climatology-defined variance. Because of the lack of climatology at small scales, this process is not possible for the small-scale analysis. Instead, from one-step to the next, we updated the background error variance to account for the correction from the previous step. Given the equation of the analysis error covariance:

$$P_a = B - B H^T (H B H^T + R)^{-1} H B \quad (12)$$

where $P_a$ is the analysis error covariance, NCODA-3DVAR provides an estimate of the diagonal (variance) in the form of a reduction of the forecast error (Cummings and Smedstad, 2013). The reduced background error from the first step becomes the background error variance for the second step. The decorrelation scale in each step is proportional to the Rossby deformation radius. For the large- and small-scale corrections, the proportionality constants were set to 1.2 and 0.5, respectively. For the SOAR function used here, these values translate to length scales of 23 km and 10 km (Jacobs et al., 2020; see their Table 1). For the small-scale update, the 10 km SOAR length scale corresponds with a Gaussian length scale of approximately 30 km (Jacobs et al., 2020; see their FIG. 3); this length scale being near the lowest wavelength effectively resolved by SWOT (Wang et al., 2019). For the representativeness error in the observation, we used the formulation embedded in NCODA-3DVAR for both scales (i.e. the same representation error is used in both large- and small-scale analysis steps). It combines the climatology and the vertical gradient in the observed profiles (Cummings, 2005).

The second assimilation step targets small-scale features, and because of the transient nature of small-scale features, a relatively long assimilation window such as that used for the first step (mesoscale correction) is not appropriate. Through experimentation over a 31-day period, we find that a 24-h assimilation window in the second, small scale analysis step (the same for all variables) produces the best skill (FIGS. 5A-5D). These experiments all used the standard assimilation windows for the first analysis step (see Section 2.3.1) and only varied the length of the assimilation window of all variables in the second analysis step.

FIG. 5A compares the evolution of the region-averaged SSH errors for the month of January 2016. It clearly shows that results degrade as the assimilation window increases in the second step. FIGS. 5B-5D show 500 m temperature increments for an assimilation window of 24, 72, and 120 h, respectively. As the assimilation window increases, more observations come into the system, which results in a larger region with suboptimal increments. This is an important result, because, prior multi-scale formations have focused heavily on the spatial decomposition of scales. The results shown in FIGS. 5A-5D suggest that there is also an essential temporal component to the multi-scale assimilation problem.

Figure 7A:
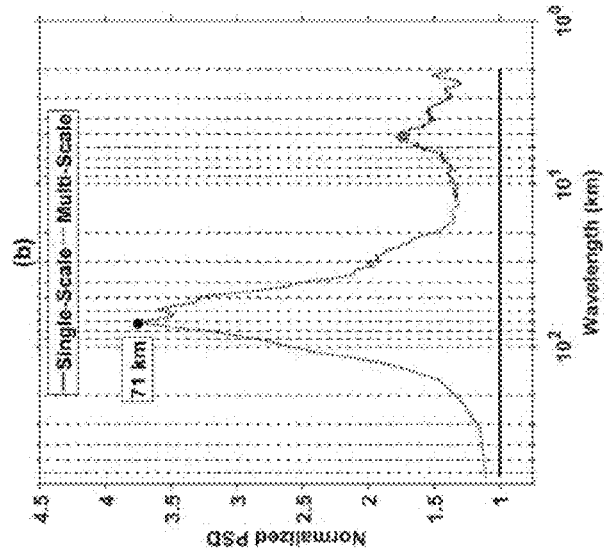
FIG. 7A illustrates time-space averaged power spectral density (PSD) of 100 m temperature increments ($° C.^2/$cpkm) from the SS-All (single-scale) and MS-All (multi-scale) experiments, in accordance with disclosed aspects.
Figure 7B:
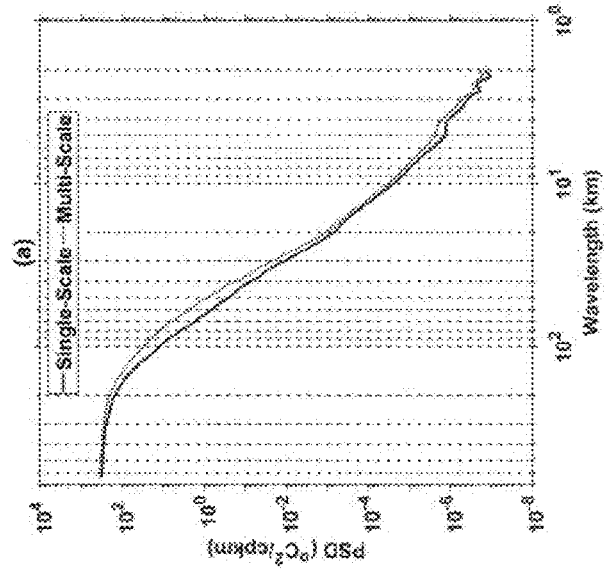
FIG. 7B illustrates normalization of each line in FIG. 7a by the SS-All PSD, in accordance with disclosed aspects.

We add the first step increment ($\delta x_L^a$ in Eq. (10)) to the background to compute innovations in the second step ($d_S$ in Eq. (11)). This ensures the second step begins with the large-scale features corrected. With the large-scale features corrected in the first step, the innovation in the second step will be more representative of smaller scales. To account for FGAT in the processing of SST observations, we added the same increment to the 3-hourly forecast over the past 24 h. This process assumes constant correction over the 24-h period, which is consistent with the FGAT process used to compute the innovation and is reasonable due to the slowly varying nature of the mesoscale features corrected by the first step. A foundation SST was not used, though this might be useful to apply in future work in order to better neglect the diurnal cycle present in the large-scale update. FIGS. 6A-6C show the increments from a large-scale analysis (FIG. 6A) and a small-scale analysis (FIG. 6B), as well as the full multi-scale increment (FIG. 6C), which is the sum of the two. FIGS. 6A and 6B suggest that the first analysis step corrects for the relatively large-scale features while the second analysis step corrects for the relatively small features. The summation of the two ensures that the final multi-scale increment includes both large- and small-scale corrections, which should therefore limit the scale aliasing of errors observed in prior work (D'Addezio et al., 2019). Wavenumber spectral analysis of the resulting multi-scale increments of 100 m temperature quantify the result (FIGS. 7A and 7B). Compared to the single-scale increments, the multi-scale increments are adding information across the entire observed spectrum (FIG. 7A). The peak difference between the two updates occurs at 71 km (FIG. 7B). However, even at 30 km scales, the multi-scale increments have approximately twice as much energy as the single-scale increments. Therefore, the multi-scale assimilation is targeting features below approximately 100 km, with significant energy extending into the small mesoscale and submesoscale regimes. Additionally, we examined the realism of these increments by comparing their spectra to the spectrum of the true background errors (Nature Run 24-h forecast minus OSSE 24-h forecast). Below −100 km, the singlescale increment was found to have power spectral density (PSD) several orders of magnitude smaller than the PSD of the true background errors (results are not shown here). This is the desired outcome; the single-scale increments are not introducing significant energy at scales primarily targeted by the second, small-scale update. The full multiscale increment (large-scale increment+small-scale increment) PSD compared more closely with the PSD of the true background errors at smaller scales (<100 km), but is also several orders of magnitude less than the PSD at scales not targeted (<~20 km)(results are not shown here).

In order to generate the multi-scale analysis field, the full multiscale increment was added to the background over a 6-h hindcast period. A 24-h forecast was then generated based on the 00Z initial condition reached at the end of the hindcast. A multi-scale analysis was performed every 24 hours. The results, presented in the following section, document the utility of this formulation of the multi-scale assimilation.

Section 3. Results

After a one-month spin up of each OSSE experiment during December 2015, assimilation of simulated observations from the Nature Run began on Jan. 1, 2016. An analysis field was generated every 24 h until Jun. 30, 2016. We compare analysis errors produced by single and multi-scale experiments. Additionally, we compare analysis errors generated by experiments that use the same assimilation configuration but assimilate different sets of data.

We begin our examination of the OSSE analysis errors with time series of 100 m temperature, SSH, and MLD errors with respect to the Nature Run from January to June (FIGS. 8A-8C). Each data point in the time series is the region-averaged mean absolute error (MAE) for grid points with at least 1000 m water depth. The types of data assimilated in each OSSE are listed in Table 1. The abbreviations "SS" and "MS" stand for single-scale and multi-scale, respectively. Experiment names ending in "Reg" mean only regular observations from the current observing network were assimilated (nadir altimeters, in situ profiles, and SST). Experiment names ending "All" assimilated all of the observation types used in this application (nadir altimeters, in situ profiles, and SST, and SWOT).

TABLE 1

Summary of the data types assimilated by each OSSE. 'SS' stands for single-scale analysis and 'MS' stands for multi-scale analysis. In situ profiles of temperature and salinity were assimilated in all experiments (except the Free Run) and have be excluded from the table in order to reduce redundancy.

|  | SST | Altimeters | SWOT |
|---|---|---|---|
| Free Run | No | No | No |
| Analysis Step 1 (large-scale) | | | |
| SS-Reg | Yes | Yes | No |
| SS-All | Yes | Yes | Yes |
| MS-Reg | Yes | Yes | No |
| MS-SST | Yes | Yes | Yes |
| MS-SWOT | Yes | Yes | Yes |

TABLE 1-continued

Summary of the data types assimilated by each OSSE. 'SS' stands for single-scale analysis and 'MS' stands for multi-scale analysis. In situ profiles of temperature and salinity were assimilated in all experiments (except the Free Run) and have be excluded from the table in order to reduce redundancy.

|  | SST | Altimeters | SWOT |
|---|---|---|---|
| MS-SST + SWOT | Yes | Yes | Yes |
| MS-All | Yes | Yes | Yes |
| Analysis Step 2 (small-scale) | | | |
| MS-Reg | Yes | Yes | No |
| MS-SST | Yes | No | No |
| MS-SWOT | No | No | Yes |
| MS-SST + SWOT | Yes | No | Yes |
| MS-All | Yes | Yes | Yes |

With respect to 100 m temperature and SSH, the Free Run performs the poorest, proving that the assimilation is adding skill. For MLD, the assimilative experiments outperform the Free Run for a majority of the time series, though improvement in skill is not universal. The strong decline in error magnitudes starting in April are due to enhanced stratification, and thus mixed layer shoaling, during the summer months. MLD is a complicated variable with variability caused by relatively small-scale surface forcing, fronts, and eddies (Jacobs et al., 2014b).

This variable serves as the highest benchmark for OSSE performance. The time series also show that the SS-Reg experiment has the second highest errors, behind the Free Run. This is followed by MS-Reg, suggesting that even without the high-resolution SWOT data, a multi-scale assimilation technique can extract useful additional information from the observations available in the regular observing network at the time of this writing. All of the OSSEs that utilize SWOT data, even the singlescale experiment (SS-All), produce less error over the time series when compared to the previously described experiments. This is encouraging as it suggests that the SWOT data are adding significant skill, and is consistent with recent work (Bonaduce et al., 2018; D'Addezio et al., 2019).

However, it becomes difficult to distinguish between error magnitudes generated by each of the subsequent multi-scale experiments. Clearly, more sensitive metrics are required to evaluate potential performance increases brought about by the multi-scale assimilation.

Figures 9A, 9B:
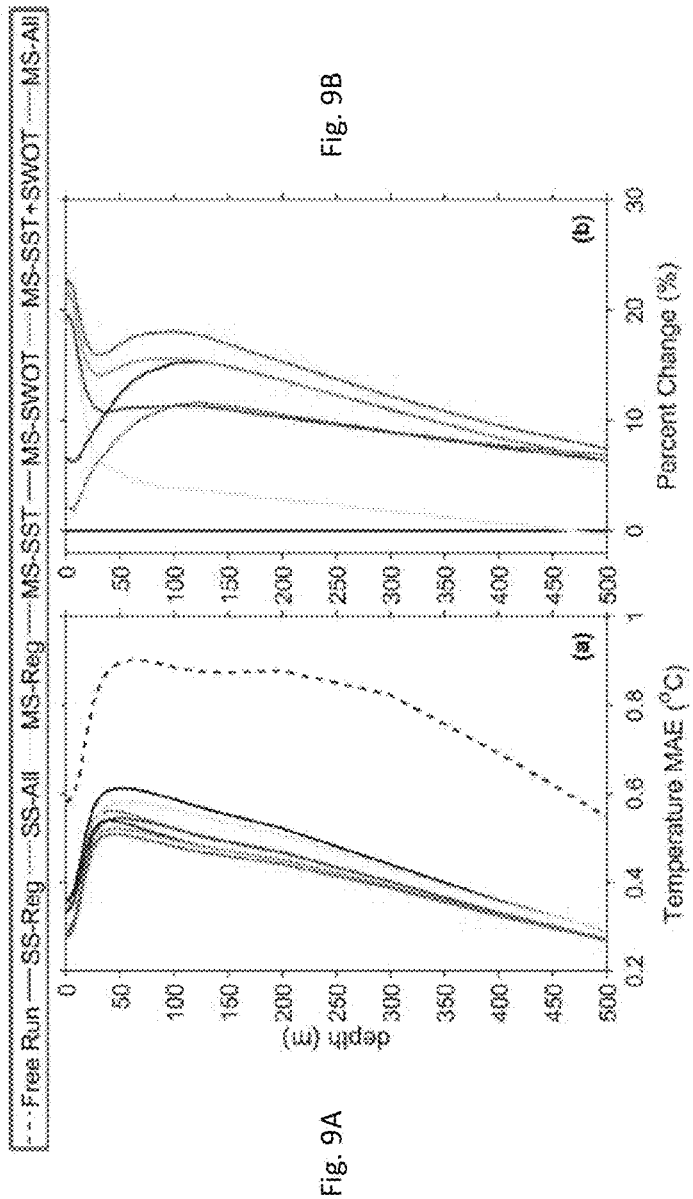
FIG. 9A illustrates time-space averaged temperature mean absolute error (MAE) (° C.) with depth relative to the Nature Run averaged over Jan. 1, 2016-Jun. 30, 2016, in accordance with disclosed aspects.
FIG. 9B illustrates percent change (%) from the SS-Reg experiment, in accordance with disclosed aspects.

FIGS. 9A and 9B show time-space averaged temperature errors with depth between January and June. The averaging in space and time only includes grid points with at least 1000 m water depth. As in the time-series described above, the temperature error depth profiles show that the Free Run, SS-Reg, and MS-Reg experiments have the highest errors, in that order (FIG. 9A). The percent change in error with respect to the SSReg experiment (FIG. 9B) accentuates differences in error magnitudes. Firstly, we observe that the MS-Reg experiment shows additional skill closer to the surface and then converges with the SS-Reg errors at depth. This further suggests that the multi-scale assimilation is useful even when utilizing only the current observing network. The relatively large performance increase near the surface suggests that the high resolution SST is having the greatest impact in the second small-scale update. The next best experiment is SS-All, a single-scale assimilation that utilizes the SWOT data. Compared to MS-Reg, this experiment has slightly higher errors near the surface, but has greater skill at depth. Thus, even when using only a single-scale analysis method, the SWOT data are adding significant skill; up to 10% compared to SS-Reg at some depths. A more nuanced comparison of the multi-scale experiments is now possible as well. MS-SST shows that assimilating only SST in the second analysis step adds additional skill over the top 100 m, and errors converge to the SS-All errors at greater depths. This further suggests that the high-resolution SST data available today have sufficient small scale information to enhance analysis skill over the top ~100 m of the water column. Assimilating only SWOT data in the second analysis step (MS-SWOT) shows improvement over the entire water column when compared with the SS-All experiment. However, the MS-SST experiment outperforms MS-SWOT over the top 50 m of the water column. Using both the SST and SWOT data in the second analysis step (MS-SST+SWOT) shows improvement over the top 100 m of the water column and then converges with the MS-SWOT experiment at greater depths. Finally, the MS-All experiment, which assimilates all available data in the second analysis step, outperforms all of the other OSSEs. This demonstrates that although the nadir altimeter data are coarse, particularly in the across-track direction, there is sufficient small-scale information within those observations to make an accurate small-scale correction to the background state. Overall, the mean error profiles are a clear demonstration that the multi-scale analysis technique used here extracts useful small-scale information from all of the data types tested. Another way to more finely differentiate the errors produced by each OSSE is to use wavenumber spectral analysis. This method evaluates the wavelengths constrained by each experiment with respect to the Nature Run. We follow D'Addezio et al. (2019) by evaluating the OSSE error spectrum of each experiment in relation to the mean of the Nature Run and the respective OSSE spectra:

$$\frac{\varepsilon_{OSSE}}{\langle \gamma_{NATURE}, \gamma_{OSSE} \rangle} \quad (13)$$

where $\varepsilon_{OSSE}$ is the PSD of the OSSE error (NATURE minus OSSE), $\gamma_{NATURE}$ is the PSD of the Nature Run, $\gamma_{OSSE}$ is the PSD of the OSSE, and the brackets denote the mean of the two spectra. Two-dimensional PSD was calculated over the square subregion shown in FIGS. 4A-4F at each analysis time between January and June. The ensemble of PSD was averaged in time. Finally, the time-averaged PSD in kx, ky space was averaged azimuthally along concentric circles of constant wavenumber k to generate a one-dimensional spectrum (Richman et al., 2012). Eq. (13) produces a normalized error spectrum with values ranging from 0 to 2 (FIG. 10). A zero value means there is no error in the OSSE at a particular wavelength. A value of 2 means that the OSSE has no skill in a particular wavelength. In this case, the OSSE and Nature Run spectra have zero correlation and the variance of the error is the summation of the variance in the OSSE and the Nature Run. A value of 1 equates to a correlation of 0.5 between the OSSE and Nature Run fields, and is used here as the threshold for whether or not the OSSE has skill.

In the time series (FIGS. 8A-8C), it is difficult to identify large differences between each of the experiments, particularly with respect to MLD. Using the normalized error spectra, differences are more immediately apparent (FIGS. 10A-10C). In all three variables, the Free Run and SS-Reg experiments reach the 1 threshold at much larger wavelengths. Unlike in the time series, the effect is amplified for MLD. For 100 m temperature and MLD, the cascade of experiments reaching the 1 threshold correlates with the skill we observed in FIGS. 9A and 9B: Free Run<SS-Reg<MSReg<SS-All<MS-SST<MS-SWOT<MS-SST+SWOT<MS-All. The differentiation is less clear for SSH. Therefore, it is helpful to document the exact wavelength each experiment crosses the 1 threshold; this term being defined as the "minimum constrained wavelength" (FIGS. 11A-11C). For 100 m temperature (FIG. 11A), a clear progression of skill between the Free Run, SS-Reg, and SS-All is apparent. Adding SWOT data within the single-scale analysis reduces constrained scales from 124 km (SS-Reg) to 101 km (SS-All), a reduction of 13 m. Moving into the multi-scale experiments, MS-Reg outperforms SS-Reg, but underperforms SS-All. This again highlights both 1) the utility of the multi-scale assimilation even when only using the current observing network and 2) the great benefit SWOT data will provide, even in just a single-scale assimilation. The MS-SST experiment produces a result comparable to the SS-All. This is expected when considering the results shown in FIGS. 9A and 9B. In the mean temperature errors over depth, the SST data only affect assimilation skill down to approximately 100 m, where the skill then converges with the SS-All results. Adding the SWOT data to the second analysis step reduces constrained scales from 101 km (SS-All) to 86 km (MS-SWOT), a reduction of 15 km. Again, adding SST data to the second analysis step (MS-SST+SWOT) does little to improve the skill for 100 m temperature, as was shown in the mean depth temperature errors (FIGS. 9A and 9B). Finally, using all available data in the multi-scale assimilation reduces constrained scales from 101 km (SS-All) to 80 km (MS-All), a reduction of 21 km. This is a clear demonstration of the utility of the multi-scale assimilation technique. It allows the extraction of additional information from the dense SWOT observations discarded by the single-scale analysis.

For SSH, the multi-scale results are less dramatic (FIG. 11B). All of the assimilative experiments significantly outperform the Free Run. The single-scale analysis utilizing the SWOT data reduces constrained scales from 80 km (SS-Reg) to 73 km (SS-All), a reduction of 7 km. However, the multi-scale experiments do not provide substantial increases in SSH skill. The SSH spectrum for this region is steep (~k-4) (FIG. 12), suggesting that a strong majority of SSH variance is concentrated at long wavelengths. Thus, the small-scale corrections provided by the second analysis step have less impact on the SSH field precisely because there is less variability at smaller scales. This phenomenon is explored more fully in Section 4.

Finally, for MLD, reductions in the minimum constrained wavelengths are more comparable to those observed for 100 m temperature (FIG. 11C). For the Free Run, MLD is the least constrained variable of the three under consideration. Again, MLD is a difficult parameter to constrain. Assimilating simulated nadir altimeter data reduces constrained scales from 537 km (Free Run) to 207 km (SS-Reg), a reduction of 330 km. Adding SWOT observations in the single-scale analysis reduces constrained scales from 207 km (SS-Reg) to 158 km (SSAll), a reduction of 49 km. Moving onto the multi-scale experiments, performing a multi-scale analysis using only the regular observations reduces constrained scales from 207 (SS-Reg) to 194 km (MS-Reg) a reduction of 13 km. The MS-SST OSSE surprisingly performs slightly worse than the SS-All experiment. The MLD is ~100 m in this region, so the small-scale SST information should be having an impact on MLD analysis accuracy. An additional metric is required to fully quantify this phenomenon. Calculating the ratios of the integrated spectra in Eq. (13) shows assimilation skill over all of the observed wavelengths:

$$\frac{\int_{k_{min}}^{k_{Nyquist}} \varepsilon_{OSSE} dk}{\int_{k_{min}}^{k_{Nyquist}} \langle \gamma_{NATURE}, \gamma_{OSSE} \rangle dk} \quad (14)$$

where k denotes wavenumbers, kmin is the minimum resolved wavenumber (1/640 km−1), and kNyquist is the Nyquist wavenumber (½ km−1). The ratios for each experiment and each variable are shown in Table 2. As with Eq. (13), the possible values extend from 0 (perfect skill) to 2 (no skill). This metric shows that over all observed wavelengths, the MS-SST experiment slightly outperforms the SS-All experiment with respect to MLD. This is because, while the MS-SST experiment crosses the 1 threshold at a longer wavelength than the SS-All experiment, the MS-SST experiment has greater skill at smaller wavelengths (~110 km-40 km; FIGS. 10A-10C). Although above the skill threshold we have established for the minimum constrained wavelength, Table 2 confirms that including SST in the second analysis step does in fact provide some additional MLD skill at smaller wavelengths. Adding only SWOT to the second analysis step continues the improvement by reducing constrained scales from 158 km (SS-All) to 142 km (MSSWOT), a reduction of 16 km. The MS-SST+SWOT experiment is slightly worse compared to the MS-SWOT experiment with respect to the minimum constrained wavelength (FIG. 11C), but slightly better when integrated across the entire spectrum (Table 2).

TABLE 2

Ratio of integrated spectra for each experiment. Values can range from 0 to 2, with smaller numbers suggesting greater skill. See Eq. (14) for information on how this statistic was calculated.

|  | 100 m temperature | SSH | MLD |
| --- | --- | --- | --- |
| Free Run | 0.78 | 0.84 | 1.34 |
| SS-Reg | 0.21 | 0.2 | 0.7 |
| SS-All | 0.15 | 0.16 | 0.55 |
| MS-Reg | 0.2 | 0.2 | 0.64 |
| MS-SST | 0.15 | 0.18 | 0.54 |
| MS-SWOT | 0.13 | 0.19 | 0.49 |
| MS-SST + SWOT | 0.13 | 0.17 | 0.48 |
| MS-All | 0.12 | 0.17 | 0.46 |

Finally, assimilating all data using the multi-scale approach reduces constrained scales from 158 km (SS-All) to 122 km (MS-All), a reduction of 36 km. Overall, the wavenumber spectral results show a clear improvement in analysis skill when adding more observations and by transitioning to a multi-scale assimilation system.

4. Discussion and Conclusions

Figure 13:
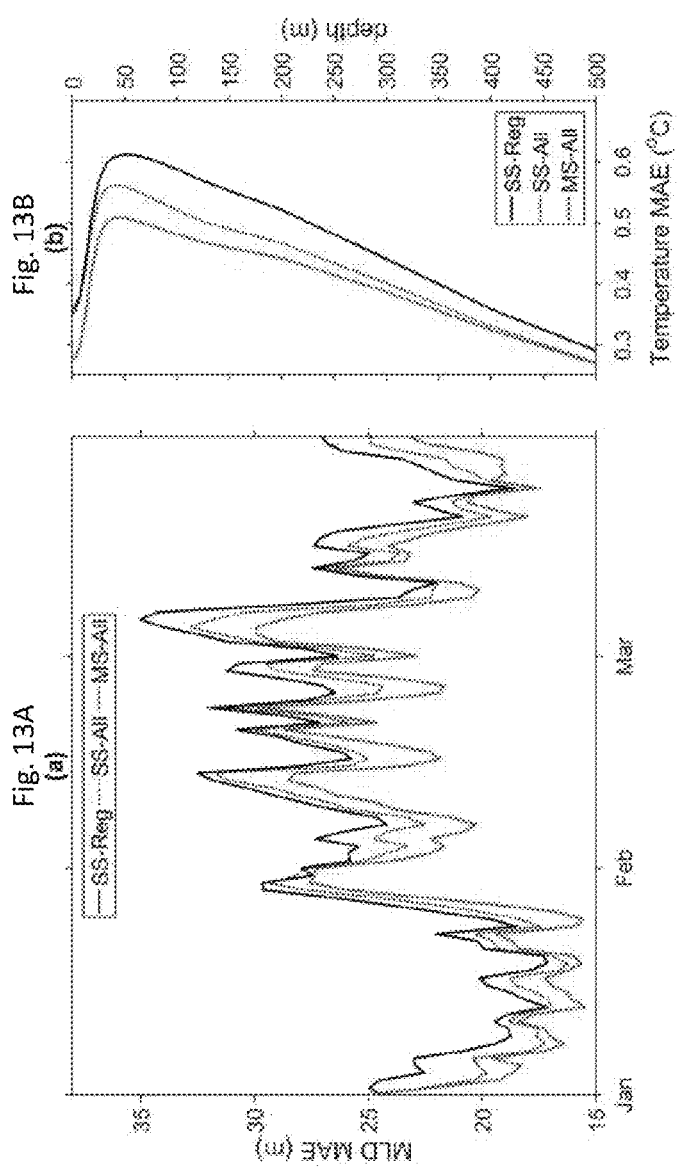
FIGS. 13A and 13B illustrate (a) Time-series of region-averaged mean absolute error (MAE) relative to the Nature Run for mixed layer depth (MLD; m); (b) Time-space averaged temperature MAE (° C.) with depth relative to the Nature Run averaged over Jan. 1, 2016-Jun. 30, 2016, in accordance with disclosed aspects.

We have shown that the two-step multi-scale assimilation produces a better analysis than a single-scale assimilation. This result is consistent across all of the experiments, each of which assimilated different sets of data in the second analysis step. We provide the findings by focusing on the three most pertinent experiments: SS-Reg, SS-All, and MS-All. The first is a representation of single-scale analysis skill available today using a constellation of nadir altimeters. SS-All suggests how a single-scale analysis will perform when SWOT data become available. Finally, MS-All is an estimate of multi-scale skill when SWOT data are available for assimilation. Time series of MLD errors for these three experiments are shown in FIG. 13A. These data suggest a clear progression of skill: adding SWOT observations to a single-scale analysis outperforms the nadir altimeter only single-scale analysis and the multi-scale analysis adds additional skill by utilizing smaller scale information in the dense SWOT data. Recall that MLD is the least accurately constrained variable of those tested here (FIGS. 7A, 7B, and 8A-8C), making the consistent ~2 m skill improvement provided by the multiscale analysis substantial. With depth, the same progression of skill is noted (FIG. 13B), further highlighting the utility of the multi-scale analysis we are exploiting.

Figure 14:
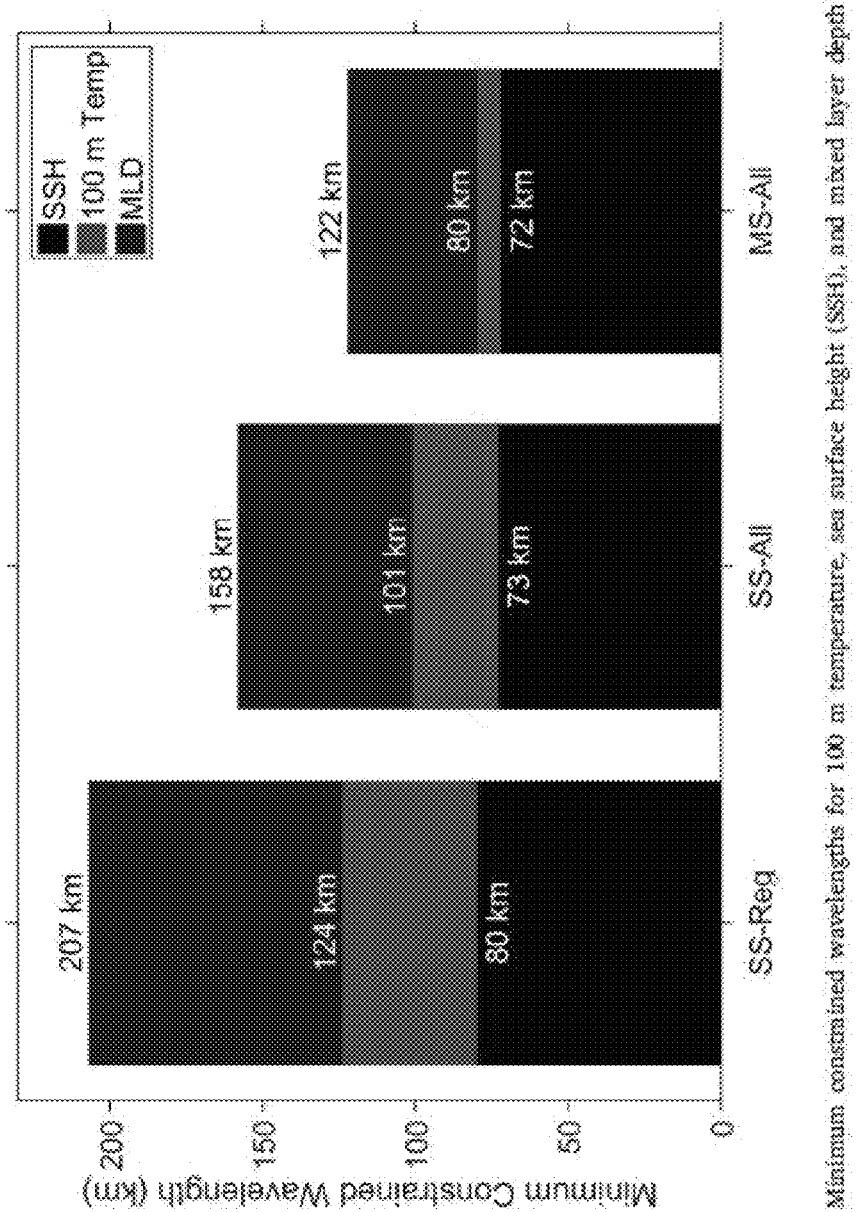
FIG. 14 illustrates minimum constrained wavelengths for 100 m temperature, sea surface height (SSH), and mixed layer depth (MLD), in accordance with disclosed aspects.

The minimum constrained wavelength for each of the tested variables (100 m temperature, SSH, and MLD) is lower moving from SS-Reg, to SS-All, to MS-All (FIG. 14). However, the rate of decline in the minimum constrained wavelength is different for each of the three variables. For SSH, the multi-scale assimilation of all data reduces constrained scales from 80 km (SS-Reg) to 72 km (MS-All), a relatively small reduction of 8 km. In contrast, the decline for MLD is steep. The multi-scale assimilation of all data reduces constrained scales from 207 km (SS-Reg) to 122 km (MS-All), a relatively large reduction of 85 km. The results for 100 m temperature sit between the two other variables.

Figure 12:
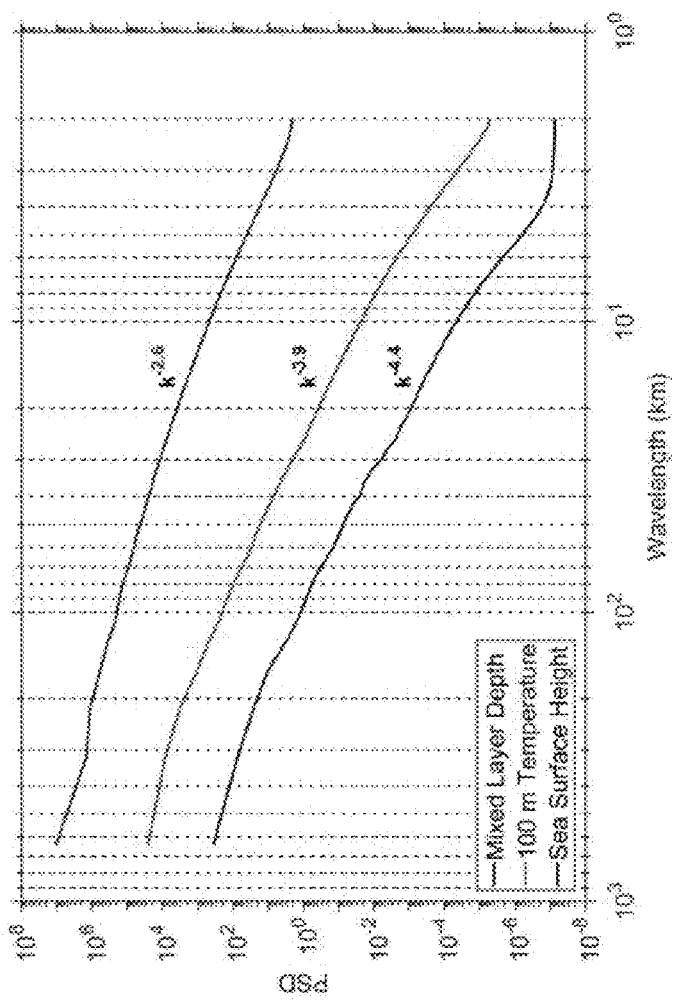
FIG. 12 illustrates time-space averaged power spectral density (PSD) for 100 m temperature (° $C.^2$/cpkm), SSH ($m^2$/cpkm), and MLD ($m^2$/cpkm). Spectral slopes were derived over 200 km-10 km, in accordance with disclosed aspects.

This phenomenon is caused by the scale dependent variability each variable has (FIG. 12). SSH has a very steep spectral slope of −4.4, suggesting that a strong majority of SSH variability is concentrated at long wavelengths. MLD, however, has a relatively flat spectral slope of −2.6, suggesting that MLD has relatively high concentrations of variability at smaller wavelengths. 100 m temperature has an intermediate slope of −3.9. Thus, the multi-scale analysis preferentially adds skill for variables that have relatively large variance at smaller wavelengths (e.g. MLD). The multi-scale analysis is less beneficial for a variable like SSH because the first large-scale update to the background has already corrected a strong majority of the signal. This is an important consideration for users. As data become denser and state estimation targets smaller scale phenomena, tuning around parameters such as SSH will become less useful. A well-tuned single-scale analysis will fare well for these larger scale parameters. Evaluation of multi-scale skill should focus on variables with sufficient small-scale variability, such as MLD and gradient fields (e.g. divergence).

Using an OSSE framework, we estimated the utility of a multiscale assimilation system. Specifically, our aim was to test how dense SWOT observations can be further utilized in the assimilation process. D'Addezio et al. (2019) showed that a single-scale assimilation of the high-resolution SWOT observations biases errors into either large- or small-scales depending on the length scale of the background error covariance (i.e. NCODA scaling factors of 1.2 vs. 0.5). The multi-scale system tested here is capable of making an accurate small-scale update without sacrificing skill at larger scales. We also showed that data from the historical observing network (in situ profiles, SST, and nadir altimeter) contain sufficient small-scale information to reduce errors in a multi-scale analysis (MS-Reg) when compared to a single-scale analysis (SS-Reg). Therefore, our results suggest that the adoption of multi-scale assimilation methodologies need not wait for SWOT data to arrive in 2022.

FIG. 14 demonstrates a clear improvement in skill when using one or more disclosed aspects. "SS-Reg" is an experiment in which only currently available observations are assimilated using the currently operational NCODA singlescale assimilation. "SS-All" is also a single-scale assimilation, but assimilates SWOT observations as well. Finally, "MS-All" assimilates all observations, including SWOT, using the disclosed multi-scale assimilation described herein. The "minimum constrained wavelength" is the smallest physical horizontal scale the assimilation/model has skill (i.e. smaller numbers are better). With all three oceanographic variables tested (sea surface height; 100 m temperature; mixed layer depth), the disclosed embodiments (MS-All) are superior.

The increase in skill when using disclosed embodiments over the current operational version stems from at least several innovations:

The two-step assimilation which corrects for model errors in both large- and small-scale domains without sacrificing skill in large scales that the current operational approach is proficient.

The use of the first assimilation step to enforce a large-scale correction without having to arbitrarily filter the background, as is done in comparable ocean multi-scale assimilation strategies (e.g. Li et al., 2015a).

By making the decorrelation length scale and the observation window proportional in each assimilation step, disclosed embodiments take into account the correlated space/time scales observed in the real ocean: large-scale features evolve slowly and small-scale features evolve more quickly.

Figure 15:
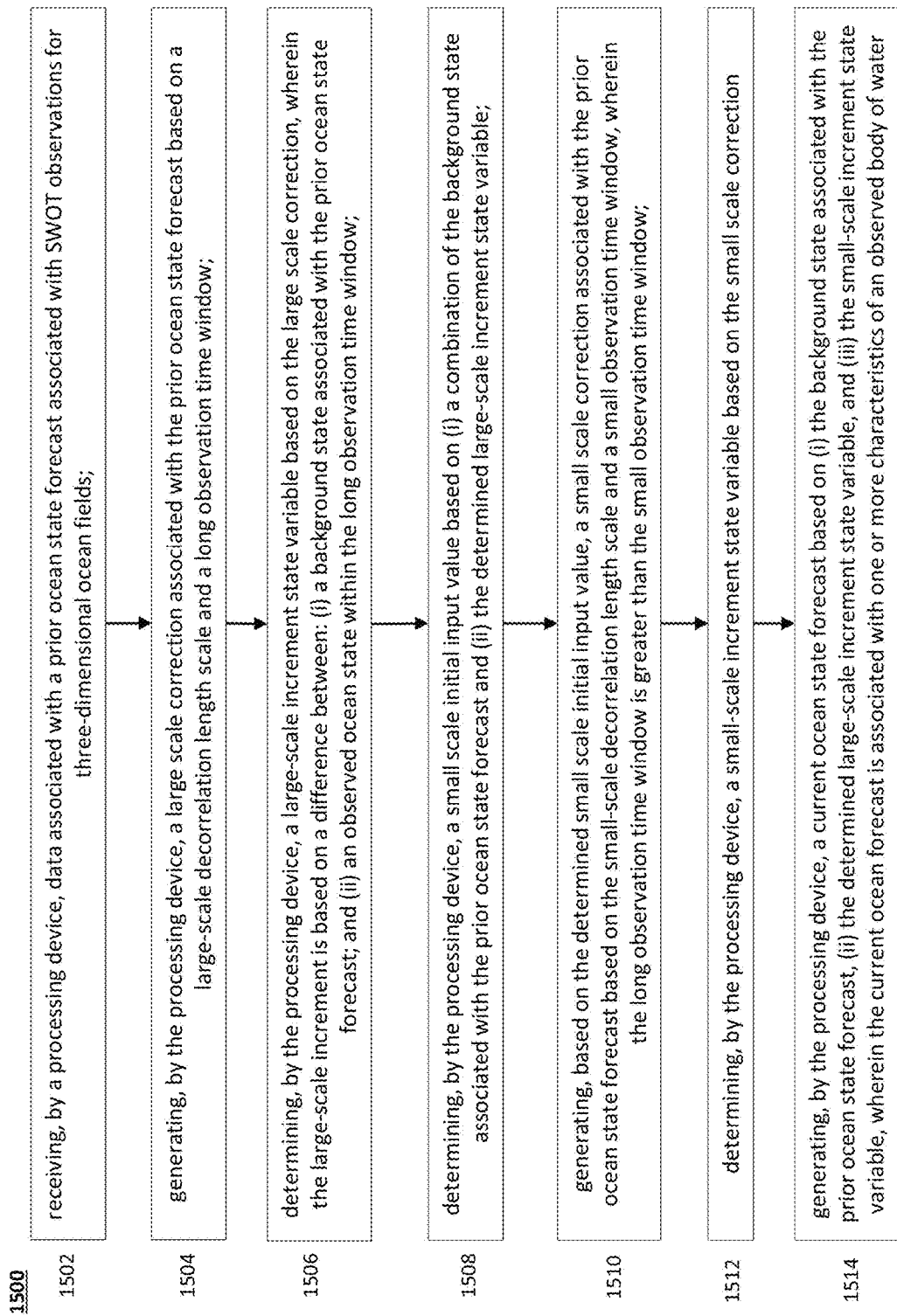
FIG. 15 illustrates an example method, in accordance disclosed aspects.

FIG. 15 illustrates an example method 1500, in accordance with one or more disclosed aspects. For example, method 1500 may be a method of forecasting an ocean state via a multi-scale two-step assimilation of Surface Water Ocean Topography (SWOT) observations. Step 1502 may include receiving, by a processing device, data associated with a prior ocean state forecast associated with SWOT observations for three-dimensional ocean fields. Step 1504 may include generating, by the processing device, a large scale correction associated with the prior ocean state forecast based on a large-scale decorrelation length scale and a long observation time window. Step 1506 may include determining, by the processing device, a large-scale increment state variable based on the large scale correction, wherein the large-scale increment is based on a difference between: (i) a background state associated with the prior ocean state forecast; and (ii) an observed ocean state within the long observation time window. Step 1508 may include determining, by the processing device, a small scale initial input value based on (i) a combination of the background state associated with the prior ocean state forecast and (ii) the determined large-scale increment state variable. Step 1510 may include generating, based on the determined small scale initial input value, a small scale correction associated with the prior ocean state forecast based on the small-scale decorrelation length scale and a small observation time window, wherein the long observation time window is greater than the small observation time window. Step 1512 may include determining, by the processing device, a small-scale increment state variable based on the small scale correction. Step 1514 may include generating, by the processing device, a current ocean state forecast based on (i) the background state associated with the prior ocean state forecast, (ii) the determined large-scale increment state variable, and (iii) the small-scale increment state variable, wherein the current ocean forecast is associated with one or more characteristics of an observed body of water. One or more steps may be repeated, added, modified, and/or excluded.

According to some aspects, one or more disclosed embodiments may have one or more specific applications. For example, ocean forecasts, such as described herein, can be used for drift prediction, search & rescue, and acoustic modeling. According to some aspects, one or more disclosed aspects may be used to develop a mission route plan associated with operating a vessel. According to some aspects, one or more disclosed aspects may be used to facilitate a water-based operation. In some cases, one or more disclosed aspects may be used to facilitate a strategic operation, which can include a defensive tactical operation or naval operation.

Figure 16:
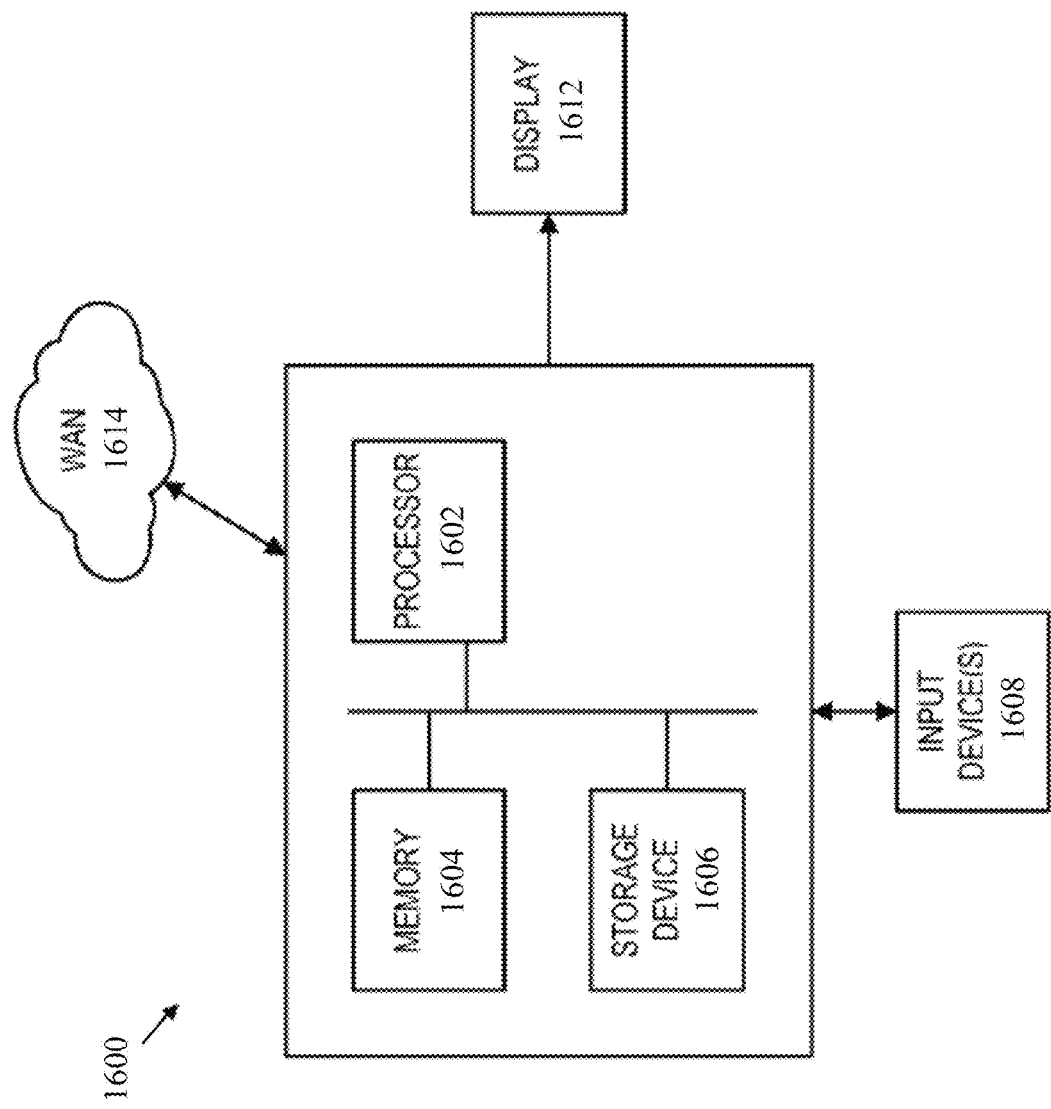
FIG. 16 illustrates a diagram of an example computer system, in accordance disclosed aspects.

One or more aspects described herein may be implemented on virtually any type of computer regardless of the platform being used. For example, as shown in FIG. 16, a computer system 1600 includes a processor 1602, associated memory 1604, a storage device 1606, and numerous other elements and functionalities typical of today's computers (not shown). The computer 1600 may also include input means 1608, such as a keyboard and a mouse, and output means 1612, such as a monitor or LED. The computer system 1600 may be connected to a local area network (LAN) or a wide area network (e.g., the Internet) 1614 via a network interface connection (not shown). Those skilled in the art will appreciate that these input and output means may take other forms. In some cases, the system 1600 may communicate with other external devices, such as a satellite system or gateway, through an appropriate network connection.

Further, those skilled in the art will appreciate that one or more elements of the aforementioned computer system 1600 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device. The present disclosure provides for a non-transitory computer readable medium comprising computer code, the computer code, when executed by a processor, causes the processor to perform aspects disclosed herein.

Embodiments for forecasting an ocean state via a multi-scale two-step assimilation of Surface Water Ocean Topography (SWOT) observations been described. Although particular embodiments, aspects, and features have been described and illustrated, one skilled in the art may readily appreciate that the aspects described herein are not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

REFERENCES

Atlas, R., 1997. Atmospheric observations and experiments to asses their usefulness in data assimilation. J. Meteorol. Soc. Japan 75, 111-130, Ballarotta, M., Ubelman, C., Pujol, M.-I., Taburet, G., Fournier, F., Legeals, J.-F., Faugère, Y., Delepulle, A., Chlton, D., Dibarboure, G., Picot, N., 2019. On the resolutions of ocean altimetry maps. Ocean Sci. 15, 1091-1109, http://dx.doi.org/10.5194/os-15-1091-2019.

Barron, C. N., Kara, A. B., Martin, P. J., Rhodes, R. C., Smedstad, L. F., 2006, Formulation, implementation and examination of vertical coordinates choices: in the Global Navy Coastal Ocean Model (NCOM). Ocean Model. 11, 347-375, http://dx.doi.org/10.1016/j.ocemod.2005.01.004.

Barron, C. N., Smedstad, L. F., 2002, Global river inflow within the Navy Coastal Ocean Model. In: Proceedings MTS/IEEE Oceans 2002 Conference. pp. 781-786.

Bonaduce, A., Benkiran, M., Remy, E., Le Traon, P. Y., Garric, G., 2018, Contribution of future width-swash altimetry missions to ocean analysis and forecasting. Ocean Sci. 14, 1405-1421, http://dx.doi.org/10.5194/os-14-1405-2018.

Capet, X., McWilliams, J. C., Molemaker, M. J., Shehepetkin, A. F., 2008. Mesoscale to submesoscale transition in the California Current System Part: I: Flow structure, eddy flux, and observational tests, J. Phys. Oceanogr. 38, 29-43, http://dx.doi.org/10.1175/2007JPO367.1.

Carrier, M. J., Ngodock, H. E., Smith. S. R., Souopgui, I. Bartels, B., 2016, Examining the potential impact of SWOT observations in an ocean analysis-forecasting system. Mon. Weather Rev. 144, 3767-3782. http://dx.doi.org/10.1175/MWR-D-15-0361.1.

Carrier, M. J., Osborne, J. J., Ngodoek, H. E., Smith, S. P., Souopgui, L, D'Addezio, J. M., 2019. A multiscale approach to high resolution profile observations within a 4DVAR analysis system. Mon. Weather Rev. 147, 627-643. http://dx.doi.org/10.1175/MWR-D-17-0300.1.

Chavanne, C., Flament, P., Luther, D., Gurgel, K.-W., 2010. The surface expression of semidiurnal internal tides near a strong source at Hawaii. Part II: Interactions with Mesoscale currents, J. Phys. Oceanogr. 40, 1180-1200. http://dx.doi.org/10.1175/2010JPO4223.1.

Cheton, D. B., DeSzoeke, R. A., Schlax, G., Naggar, K. E., Siwertz, N., 1998. Geographical variability of the first baroclinic Rossby radius of deformation. J. Phys. Oceanogr. 28, 433-460.

Cummings, J. A., 2005, Operational multivariate ocean data assimilation. Q. J. R. Meteorol. Soc. 131, 3583-3604. http://dx.doi.org/10.1256/qj.05.105.

Cummings. J. A., Smedstad, O. M., 2013. Variational Data Assimilation far the Global Ocean Data Assimilation for Atmospheric, Oceanic and Hydrologic Applications (Vol. II). Springer-Verlag Berlin Heidelberg, http://dx.doi.org/10.1007/978-3-642-35088-7_13, chapter 13.

D'Addezio, J. M., Jacobs, G. A., Yaremchuk, M., Souopgui, I., 2020. Submesoscale eddy vertical covariances and dynamical constraints from high-resolution numerical simulations. J. Phys. Oceanogr. 50, 1087-1115. http://dx.doi.org/10.1175/JPO-D-19-0100.1.

D'Addezio, J. M., Smith, S., Jacobs, G. A., Helber, R. W., Rowley, C., Souopgui, L, Carrier, M. J., 2019, Quantifying wavelengths constrained by simulated SWOT observations in a submesoscale resolving ocean analysis/forecasting system. Ocean Model, 135, 40-55, http://dx.doi.org/10.1016/j.ocemod.2019.02.001.

Daley, R., 1991. Atmospheric Dam Analysis. http://dk.doi.org/10.2307/2291025.

Ducet, N., Le Traon, P. Y., Reverdin, G., 2000. Global high-resolution mapping of ocean circulation from the combination of TOPEX/Poseidon and ERS-1 and -2. J. Geophys. Res. 105 (C8). 19477-19498.

Egbert, G. D., Erofeeva, S. Y., 2002. Efficient inverse modeling of barotropic ocean tides. J. Atmos. Oceanic Tech. 19, 183-204.

Fu, L. L., Ubelmann, C., 2014. On the transition from profile altimetry to swath altimeter for observing global ocean surface topography. J. Atmos. Ocean. Technol. 31, 560-568. http://dx.doi.org/10.1175/JTECH-D-13-00109.1.

Gaultier, L., Ubelmann, C., Fu, L.-L., 2016. The challenge of using future SWOT data for oceanic held reconstruction. J. Atmos. Ocean. Technol. 33, 119-126, http://dx.doi.org/10.1175/JTECH-D-15-0160.1.

Gratton, S., Rincon-Camacho, M., Simon, E., Toint, P. L., 2015. Observation thinning in data assimilation computations. EURO J. Comput. Optim. 3, 31-51. http://dx.doi.org/10.1007/s13675-014-0025-4.

Halliwell, Jr., G. R., Srinivasan. A., Kourafalou, V., Yang, H., Willey, D., Le Henaff, M., Atlas, R., 2014. Rigorous evaluation of a fraternal twin ocean OSSE system for the open gulf of Mexico. J. Atmos. Ocean. Technol. 31, 105-129. http://dx.doi.org/10.1175/JTECH-D-13-00011.1, Helber, R. W., Townsend, T. L., Barron. C. N., Dastugue, J. M., Carnes. M. R., 2013. Validation Test Report for the Improved Synthetic Ocean Profile (ISOP) System, Part 1: Synthetic Profile Methods and Algorithm. Naval Research Laboratory Memorandum Report NRL/MR/7320-13-9364, [Available from NRL, code 7320, Bldg. 1009, Stennis Space Center, MS 39529-5004], Hogan. T. F., et. al., 2014. The navy global environmental model. Oceanography 27, 116-125. http://dx.doi.org/10.5670/oceanog.2014.73.

Jacobs, G. A., D'Addezio, J. M., Bartels, B., Spence, P. L., 2020. Constrained scales in ocean forecasting. Adv. Space Res. http://dx.doi.org/10.1016/j.asr.2019.09.018.

Jacobs, G. A., Richman, J. G., Doyle, J. D., Spence, P. L., Bartels, B. P., Barron, C. N., Helber, R. W., Bub, F. L., 2014b, Simulating conditional deterministic predictability within ocean frontogenesis, Ocean Model. 78, 1-16. http://dx.doi.org/10.1016/j.ocemod.2014.02.004.

Jacobs, G. A., et al., 2014a. Data assimilation considerations for improved ocean predictability during the Gulf of Mexico Grand Lagrangian Deployment (GLAD). Ocean Model 83, 98-117. http://dx.doi.org/10.1016/j.ocemod.2014.09.003.

Li, Z., McWilliams, J. C., Ide, K., Farrara, J. D., 2015a. A multi scale variational data assimilation scheme: Formulation and illustration. Mon, Weather Rev. 143, 3804-3822. http://dx.doi.org/10.1175/MWR-D-14-00384.1.

Li, Z., McWilliams, J. C., Ide, K., Farrara, J. D., 2015b. Coastal ocean data assimilation using a multi-scale three-dimensional variational scheme. Ocean Dyn. 65, 1001-1015. http://dx.doi.org/10.1007/s10236-015-0850-x.

Li, Z., Wang, J., Fu, L.-L., 2019. An observing system simulation experiment for ocean state estimation to assess the performance of the SWOT mission: Part 1—A twin experiment. J. Geophys. Res. Oceans 124, 4838-4855. http://dx.doi.org/10.1029/2018JC014869.

Li, X., Zhu, J., Xiao, Y., Wang, R., 2010. A model-based observation-thinning scheme for the assimilation of high-resolution SST in the shelf and coastal seas around China. J, Atmos. Ocean. Technol 27, 1044-1058. http://dx.doi.org/10.1175/2010JTECHO709.1.

Liu. Z.-Q., Rabier, F., 2002. The interaction between model resolution, observation resolution, and observation density in data assimilation. A one-dimensional study. Q. J. R. Meteorol. Soc. 128, 1367-1386.

Metzger, E. J., Helber. R. W., Hogan, P. J., Posey. P. G., Thoppil, P. G., Townsend, T. L, Wallcraft, A. J., Smedstad, O. M., Franklin, D. S., Zamudo-Lopez, L, Phelps, M. W., 2017. Global Ocean Forecast System 3.1 Validation Test, Naval Research Laboratory Memorandum Report NRL/MR/7320-17.9722, [Available from NRI, code 7320, Bldg. 1009, Stennis Space Center, MS 39529-5004].

Metzger, E. J., Smedstad, O. M., Thoppil, P. G., Hurlburt, H. E., Cummings, J. A., Wallcraft, A. J., Zamudio, L., Franklin, D. S., Posey, P. G., Phelps, M. W., Hogan, P. J., Bub, F. I., DeHaan, C. J., 2014. US Navy operational global ocean and Arctic ice prediction systems. Oceanography 27 (3), 32-43. http://dx.doi.org/10.5670/oceanog.2014.66.

Miyazawa, Y., Varlamov, S. M., Miyama, T., Guo, X., Hihara, T., Kiyomatsu, K., Kachi, M., Kurihara, Y., Muakami, H., 2017. Assimilation of high-resolution sea surface temperature data into an operational nowcast/forecast system around Japan using a multi-scale three-dimensional variational scheme. Ocean Dyn. 67, 7.13-728. http://dx.doi.org/10.1007/s10236-017-1056-1.

Muscarella, P. A., Carrier, M. J., Ngdock, H. E., 2014. An examination of a multi-scale three-dimensional variational data assimilation scheme in the kuroshio extension using the naval coastal ocean model. Cout. Shelf Res. 73, 41-48.

Ochotta, T., Gebhardt, C, Saupe, D., Wergen, W., 2005, Adaptive thinning of atmospheric observations in data assimilation with vector quantization and filtering methods. Q. J. R, Meteorol. Soc. 131, 3427-3437. http://dx.doi.org/10.1256/qj.05.94.

Richman, J. G., Arbic, B. K., Shriver, J. F., Metzger, E. J., Wallcraft, A. J., 2012, Inferring dynamics from wavenumber spectra of an eddying global ocean model with embedded tides. J, Geophys. Res. 117, C12012. http://dx.doi.org/10.1029/2012JC008364.

Smith. S., Carrier, M., Ngodock, H., Shriver, J., Muscarella, P., Penta, H., Carroll, S., 2015. Validation Test Report for the Navy Coastal Oman Model Pour-Dimensional Variational Assimilation (NCOM 4DVAR) System Version 1.0. Naval Research laboratory Memorandum Report NRL/MR/7320-15-9574, [Available from NRL, code 7320, Bldg. 1009, Stennis Space Center MS 39529-5004].

Wang, J., Fu, L.-L., Torres, H. S., Chen, S., Qiu, B., Menemenlis, D., 2019. On the spatial scales to be resolved fey the surface water and ocean topography ka-band radar interferometer. J. Atmos. Ocean. Technol. 36, 87-99. http://dx.doi.org/10.1175/JTECH-D-18-0119.1.

What is claimed is:

1. A method of forecasting an ocean state via a multi-scale two-step assimilation of Surface Water Ocean Topography (SWOT) observations, the method comprising:
   receiving, by a processing device, data associated with a prior ocean state forecast associated with SWOT observations for three-dimensional ocean fields;
   generating, by the processing device, a large scale correction associated with the prior ocean state forecast based on a large-scale decorrelation length scale and a long observation time window;
   determining, by the processing device, a large-scale increment state variable based on the large scale correction, wherein the large-scale increment is based on a difference between: (i) a background state associated with the prior ocean state forecast, and (ii) an observed ocean state within the long observation time window;
   determining, by the processing device, a small scale initial input value based on (i) a combination of the background state associated with the prior ocean state forecast and (ii) the determined large-scale increment state variable;
   generating, based on the determined small scale initial input value, a small scale correction associated with the prior ocean state forecast based on a small-scale decorrelation length scale and a small observation time window, wherein the long observation time window is greater than the small observation time window;
   determining, by the processing device, a small-scale increment state variable based on the small scale correction; and
   generating, by the processing device, a current ocean state forecast based on (i) the background state associated with the prior ocean state forecast, (ii) the determined large-scale increment state variable, and (iii) the small-scale increment state variable, wherein the current ocean forecast is associated with one or more characteristics of an observed body of water.

2. The method of claim 1, wherein the small observation time window is about 24 hours.

3. The method of claim 1, wherein the long observation time window is about 5 days.

4. The method of claim 1, wherein receiving the data associated with the prior ocean state forecast comprises receiving the prior ocean state forecast via a Navy Coupled Ocean Data Assimilation (NCODA) system.

5. The method of claim 1, wherein the prior ocean state forecast comprises one or more of the following observations: sea surface temperature (SST), in situ profiles of temperature and/or salinity, or sea surface height (SSH).

6. The method of claim 1, wherein the small scale initial input value comprises an updated background state based on the large-scale correction.

7. The method of claim 6, wherein generating the small-scale correction targets residual, small-scale error unaccounted for in the large scale correction.

8. The method of claim 1, wherein current ocean state forecast comprises one or more of the following: sea surface temperature (SST), profiles of temperature and/or salinity, or sea surface height (SSH).

9. A system for forecasting an ocean state via a multi-scale two-step assimilation of Surface Water Ocean Topography (SWOT) observations, the system comprising:
   a processing device; and
   a memory device operably coupled to the processing device, the memory device storing computer-readable instructions that, when executed, cause the processing device to perform:
      receiving data associated with a prior ocean state forecast associated with SWOT observations for three-dimensional ocean fields;
      generating a large scale correction associated with the prior ocean state forecast based on a large-scale decorrelation length scale and a long observation time window;
      determining a large-scale increment state variable based on the large scale correction, wherein the large-scale increment is based on a difference between: (i) a background state associated with the prior ocean state forecast, and (ii) an observed ocean state within the long observation time window;

determining a small scale initial input value based on (i) a combination of the background state associated with the prior ocean state forecast and (ii) the determined large-scale increment state variable;

generating, based on the determined small scale initial input value, a small scale correction associated with the prior ocean state forecast based on a small-scale decorrelation length scale and a small observation time window, wherein the long observation time window is greater than the small observation time window;

determining a small-scale increment state variable based on the small scale correction; and generating a current ocean state forecast based on (i) the background state associated with the prior ocean state forecast, (ii) the determined large-scale increment state variable, and (iii) the small-scale increment state variable, wherein the current ocean forecast is associated with one or more characteristics of an observed body of water.

10. The system of claim 9, wherein the small observation time window is about 24 hours.

11. The system of claim 9, wherein the long observation time window is about 5 days.

12. The system of claim 9, wherein receiving the data associated with the prior ocean state forecast comprises receiving the prior ocean state forecast via a Navy Coupled Ocean Data Assimilation (NCODA) system.

13. The system of claim 9, wherein the prior ocean state forecast comprises one or more of the following observations: sea surface temperature (SST), in situ profiles of temperature and/or salinity, or sea surface height (SSH).

14. The system of claim 9, wherein the small scale initial input value comprises an updated background state based on the large-scale correction.

15. The system of claim 14, wherein generating the small-scale correction targets residual, small-scale error unaccounted for in the large scale correction.

16. The system of claim 9, wherein current ocean state forecast comprises one or more of the following: sea surface temperature (SST), profiles of temperature and/or salinity, or sea surface height (SSH).

17. A non-transitory computer readable medium comprising computer-readable instructions, the computer-readable instructions, when executed, cause a processing device to perform:

receiving data associated with a prior ocean state forecast associated with SWOT observations for three-dimensional ocean fields;

generating a large scale correction associated with the prior ocean state forecast based on a large-scale decorrelation length scale and a long observation time window;

determining a large-scale increment state variable based on the large scale correction, wherein the large-scale increment is based on a difference between: (i) a background state associated with the prior ocean state forecast, and (ii) an observed ocean state within the long observation time window;

determining a small scale initial input value based on (i) a combination of the background state associated with the prior ocean state forecast and (ii) the determined large-scale increment state variable;

generating, based on the determined small scale initial input value, a small scale correction associated with the prior ocean state forecast based on a small-scale decorrelation length scale and a small observation time window, wherein the long observation time window is greater than the small observation time window;

determining a small-scale increment state variable based on the small scale correction; and generating a current ocean state forecast based on (i) the background state associated with the prior ocean state forecast, (ii) the determined large-scale increment state variable, and (iii) the small-scale increment state variable, wherein the current ocean forecast is associated with one or more characteristics of an observed body of water.

18. The non-transitory computer readable medium of claim 17, wherein the small observation time window is about 24 hours.

19. The non-transitory computer readable medium of claim 17, wherein the long observation time window is about 5 days.

20. The non-transitory computer readable medium of claim 17, wherein receiving the data associated with the prior ocean state forecast comprises receiving the prior ocean state forecast via a Navy Coupled Ocean Data Assimilation (NCODA) system.

21. The non-transitory computer readable medium of claim 17, wherein the prior ocean state forecast comprises one or more of the following observations: sea surface temperature (SST), in situ profiles of temperature and/or salinity, or sea surface height (SSH).

22. The non-transitory computer readable medium of claim 17, wherein the small scale initial input value comprises an updated background state based on the large-scale correction.

23. The non-transitory computer readable medium of claim 22, wherein generating the small-scale correction targets residual, small-scale error unaccounted for in the large scale correction.

24. The non-transitory computer readable medium of claim 17, wherein current ocean state forecast comprises one or more of the following: sea surface temperature (SST), profiles of temperature and/or salinity, or sea surface height (SSH).

* * * * *